(12) United States Patent
Nilsson et al.

(10) Patent No.: US 9,595,374 B2
(45) Date of Patent: Mar. 14, 2017

(54) POLYMER COMPOSITION AND A POWER CABLE COMPRISING THE POLYMER COMPOSITION

(75) Inventors: Ulf Nilsson, Stenungsund (SE); Annika Smedberg, Myggenas (SE); Alfred Campus, Eysins (CH)

(73) Assignee: BOREALIS AG, Vienna (AU)

(*) Notice: Subject to any disclaimer, the term of this patent is extended or adjusted under 35 U.S.C. 154(b) by 764 days.

(21) Appl. No.: 13/883,271

(22) PCT Filed: Nov. 1, 2011

(86) PCT No.: PCT/EP2011/069182
§ 371 (c)(1),
(2), (4) Date: Jul. 12, 2013

(87) PCT Pub. No.: WO2012/059483
PCT Pub. Date: May 10, 2012

(65) Prior Publication Data
US 2013/0284486 A1 Oct. 31, 2013

(30) Foreign Application Priority Data
Nov. 3, 2010 (EP) .................................... 10189853

(51) Int. Cl.
| H01B 9/02 | (2006.01) |
|---|---|
| H01B 3/44 | (2006.01) |
| C08K 3/04 | (2006.01) |
| C08K 5/01 | (2006.01) |
| C08K 5/14 | (2006.01) |

(52) U.S. Cl.
CPC .............. H01B 9/027 (2013.01); C08K 3/04 (2013.01); C08K 5/01 (2013.01); C08K 5/14 (2013.01); H01B 3/441 (2013.01)

(58) Field of Classification Search
USPC .................................................. 174/120 SC
See application file for complete search history.

(56) References Cited

U.S. PATENT DOCUMENTS

| | | | |
|---|---|---|---|
| 3,098,893 A | 7/1963 | Pringle et al. | |
| 3,717,720 A | 2/1973 | Snellman | |
| 4,049,757 A | 9/1977 | Kammel et al. | |
| 4,721,761 A | 1/1988 | Omae et al. | |
| 4,813,221 A | 3/1989 | Christian | |
| 5,246,783 A * | 9/1993 | Spenadel ............... | H01B 3/441 174/110 R |
| 5,461,850 A | 10/1995 | Bruyneel | |
| 5,539,075 A | 7/1996 | Gustafsson et al. | |
| 5,554,826 A | 9/1996 | Gentry | |
| 5,556,697 A * | 9/1996 | Flenniken ............... | C08K 3/04 174/105 SC |
| 5,661,965 A | 9/1997 | Yanagisawa | |
| 5,718,947 A * | 2/1998 | Martin .................... | B05D 5/083 427/243 |
| 5,731,082 A * | 3/1998 | Gross ..................... | H01B 3/441 174/110 PM |
| 5,822,973 A | 10/1998 | Kaneko | |
| 5,852,135 A | 12/1998 | Kanai et al. | |
| 6,140,589 A | 10/2000 | Blackmore | |
| 6,231,978 B1 | 5/2001 | Keogh | |
| 6,302,175 B1 | 10/2001 | Shoyama | |
| 6,559,385 B1 | 5/2003 | Johnson | |
| 7,473,742 B2 | 1/2009 | Easter | |
| 8,831,389 B2 | 9/2014 | Mccullough | |
| 2001/0030053 A1 | 10/2001 | Gadessaud et al. | |
| 2002/0022687 A1 | 2/2002 | Hikita et al. | |
| 2002/0034689 A1 | 3/2002 | Hoshida et al. | |
| 2002/0042451 A1 | 4/2002 | Sugaya | |
| 2002/0127401 A1 | 9/2002 | Perego et al. | |
| 2004/0108038 A1 | 6/2004 | Cordonnier | |
| 2004/0138351 A1 | 7/2004 | Kaprinidis et al. | |
| 2004/0210002 A1 | 10/2004 | Haekoenen et al. | |
| 2005/0279074 A1 | 12/2005 | Johnson | |
| 2006/0055075 A1 | 3/2006 | Hoshida et al. | |
| 2006/0102377 A1 | 5/2006 | Johnson | |
| 2006/0116279 A1 | 6/2006 | Kogoi et al. | |
| 2006/0151758 A1 | 7/2006 | Reyes | |
| 2006/0191619 A1 | 8/2006 | Meersschaut | |
| 2006/0249705 A1 | 11/2006 | Wang et al. | |
| 2007/0000682 A1 | 1/2007 | Varkey | |
| 2007/0044992 A1 | 3/2007 | Bremnes | |
| 2007/0048472 A1 | 3/2007 | Krishnaswamy et al. | |
| 2007/0205009 A1 | 9/2007 | Figenschou | |

(Continued)

FOREIGN PATENT DOCUMENTS

| DE | 17 69 723 A1 | 2/1972 |
|---|---|---|
| EP | 0 150 610 A2 | 8/1985 |

(Continued)

OTHER PUBLICATIONS

Shamiri et al., "The influence of Ziegler-Natta and metallocene Catalysts on Polyolefin structure, properties, and processing ability," Materials 7 (2014) 5069-5108.

Global high voltage solutions, Dow Wire & Cable, Published Aug. 2008, The Dow Chemical Company.

Declaration of Dr Timothy J. Person dated Oct. 6, 2015 with attachments including copies of (1) the invoice 09/45106196 of Aug. 7, 2008, (2) the certificate of analysis 3802244 dated Aug. 7, 2008, (3) the invoice 09/45105512 of Jul. 24, 2008 and (4) the certificate of analysis 3783325 dated Jul. 24, 2008.

Declaration of Mr Kent Neuvar with attachment dated Oct. 6, 2015 including copy of MSDS Ideal EC 631.

Experimental report by Dr Dachao Li dated Oct. 6, 2015.

Rudnick, Leslie and Ronald Shukbin, Synthetic Lubricants and High-performance Functional fluids, Revised and Expanded, CRC Press, 1999, p. 376-377.

(Continued)

Primary Examiner — William H Mayo, III
Assistant Examiner — Krystal Robinson
(74) Attorney, Agent, or Firm — Knobbe, Martens Olson & Bear LLP

(57) ABSTRACT

The invention relates to a use of a polymer composition for producing an insulation layer of an AC power cable with and to an AC cable surrounded by at least an insulating layer comprising said polymer composition.

20 Claims, No Drawings

(56) References Cited

U.S. PATENT DOCUMENTS

| | | |
|---|---|---|
| 2007/0253778 A1 | 11/2007 | Figenschou |
| 2007/0299173 A1 | 12/2007 | Wolfschwenger et al. |
| 2008/0124521 A1 | 5/2008 | Niino |
| 2008/0227887 A1* | 9/2008 | Klier .................. H01B 3/441 523/173 |
| 2008/0315159 A1 | 12/2008 | Minagoshi |
| 2009/0045908 A1 | 2/2009 | Tanaka et al. |
| 2009/0227717 A1 | 9/2009 | Smedberg et al. |
| 2009/0238957 A1 | 9/2009 | Clancy |
| 2009/0280282 A1 | 11/2009 | Doty et al. |
| 2010/0038112 A1 | 2/2010 | Grether |
| 2010/0059249 A1 | 3/2010 | Powers |
| 2010/0086268 A1 | 4/2010 | Reyes |
| 2010/0293783 A1 | 11/2010 | Goldsworthy |
| 2010/0300592 A1 | 12/2010 | Miyazaki |
| 2011/0042624 A1 | 2/2011 | Minagoshi |
| 2011/0196078 A1 | 8/2011 | Wolfschwenger et al. |
| 2012/0163758 A1 | 6/2012 | McCullough |
| 2012/0170900 A1 | 7/2012 | Fancher |
| 2012/0298403 A1 | 11/2012 | Johnson |

FOREIGN PATENT DOCUMENTS

| | | |
|---|---|---|
| EP | 0 463 402 A2 | 1/1992 |
| EP | 0517868 | 11/1995 |
| EP | 0688794 B1 | 8/1998 |
| EP | 0887355 A1 | 12/1998 |
| EP | 1168469 A2 | 1/2002 |
| EP | 11211289 A1 | 6/2002 |
| EP | 0810235 B1 | 11/2004 |
| EP | 1484345 A1 | 12/2004 |
| EP | 1669403 A1 | 6/2006 |
| EP | 1695996 A1 | 8/2006 |
| EP | 1731564 B1 | 3/2010 |
| JP | 2018811 | 1/1990 |
| JP | 2272031 A | 11/1990 |
| JP | 05279578 A * | 10/1993 |
| JP | 05-062529 | 12/1993 |
| JP | 05-298927 | 12/1993 |
| JP | 06-251624 | 9/1994 |
| JP | 06-251625 | 9/1994 |
| JP | 7021850 A | 1/1995 |
| JP | 08-059720 A | 3/1996 |
| JP | 09-306265 | 11/1997 |
| JP | H10-259212 A | 9/1998 |
| JP | 10-283851 | 10/1998 |
| JP | 2000-053815 A | 2/2000 |
| JP | 2001-04148 | 2/2001 |
| JP | 2001-501660 | 2/2001 |
| JP | 2006081400 A2 | 8/2006 |
| JP | 2006291022 A | 10/2006 |
| WO | 93/08222 A1 | 4/1993 |
| WO | 98/14537 A1 | 4/1998 |
| WO | 9920690 A1 | 4/1999 |
| WO | 0025324 A1 | 5/2000 |
| WO | 0137289 A1 | 5/2001 |
| WO | 0300754 A1 | 1/2003 |
| WO | 2004041919 A2 | 5/2004 |
| WO | 2006/089744 A1 | 8/2006 |
| WO | 2006-089793 A1 | 8/2006 |
| WO | 2006/131264 A1 | 12/2006 |
| WO | 2006/131266 A1 | 12/2006 |
| WO | 2008070022 A1 | 6/2008 |
| WO | 2009/000326 A1 | 12/2008 |
| WO | 2009/002653 A1 | 12/2008 |
| WO | 2009/012041 A1 | 1/2009 |
| WO | 2009/012092 A1 | 1/2009 |
| WO | 2009007116 A1 | 1/2009 |
| WO | 2009007117 A1 | 1/2009 |
| WO | 2009007118 A1 | 1/2009 |
| WO | 2009007119 A2 | 1/2009 |
| WO | 2009/056409 A1 | 5/2009 |
| WO | 2010/003650 A1 | 1/2010 |
| WO | 2011/057926 A1 | 5/2011 |
| WO | 2011/057927 A1 | 5/2011 |

OTHER PUBLICATIONS

Communication of a Notice of Opposition dated Oct. 19, 2015 for EP 10773622.5.
Communication dated Aug. 19, 2015 for EP Application 10771773.8.
U.S. Appl. No. 13/509,252, filed Jul. 31, 2012, including its prosecution history, the references and the Office Actions therein.
U.S. Appl. No. 13/509,256, filed Jul. 16, 2012, including its prosecution history, the references and the Office Actions therein.
U.S. Appl. No. 13/509,257, filed Jul. 31, 2012, including its prosecution history, the references and the Office Actions therein.
U.S. Appl. No. 13/509,268, filed Aug. 3, 2012, including its prosecution history, the references and the Office Actions therein.
International Search Report and Written Opinion issued on Nov. 30, 2010 for International Application No. PCT/EP2010/066709.
International Search Report and Written Opinion issued on Dec. 2, 2010 for international Application No. PCT/EP2010/066712.
International Search Report and Written Opinion issued on Dec. 6, 2010 for International Application No. PCT/EP2010/066711.
International Search Report dated Dec. 9, 2010 for International Application No. PCT/EP2010/066710.
Smedberg et al. "Effect of molecular structure and topology on network formation in peroxide crosslinked polyethylene", Polymer 44 (2003) 3395-3405.
International Search Report for PCT/EP2011/053025, mailed Aug. 11, 2011.
Machine translation of JP 2001-501660A; publication date Feb. 2001.
Primol 352 Product Information Sheet, 3 pages (Copyright 2001-2014 Exxon Mobile Corp.
Office Action dated Jan. 5, 2015 for JP2013-537116.
International Search Report dated Apr. 26, 2012 for International Application No. PCT/EP2011/069182.
Communication of a Notice of Opposition dated Dec. 16, 2015 for EP 10771774.6.
Declaration and Test Report on Carbon-Carbon Unsaturation of DXM-446 LDPE of Dr Timothy J. Person dated Dec. 8, 2015.
Test Report on Preparing the Plaques for Electrical Conductivity Testing dated Dec. 7, 2015.
Test Report Shanghai Electric Cable Institute R&D Center—English Version.
Olsson et al., Experimental Determination of DC Conductivity for XPLE Insulation, Nordic Insulation Symposium 2009 (Nord-IS 09), Jun. 15, 2009, 55-58.
R. Bodega, Space Charge Accumulation in Polymeric High Voltage DC Cable Systems, Thesis, Technical University Delft, ISBN 90-8559-228-3, 2006 pp. vii-xii, 9-12, 75-89.

* cited by examiner

POLYMER COMPOSITION AND A POWER CABLE COMPRISING THE POLYMER COMPOSITION

CROSS REFERENCE TO RELATED APPLICATIONS

This application is the U.S. National Phase of International Application No. PCT/EP2011/069182, filed Nov. 1, 2011, designating the U.S. and published as WO 2012/059483 on May 10, 2012 which claims the benefit of European Patent Application No. 10189853.4 filed Nov. 3, 2010.

FIELD OF INVENTION

The invention concerns a polymer composition suitable for a layer of a power cable, the use of the polymer composition in a layer of a power cable, a power cable comprising the polymer composition and to a process for producing the cable.

BACKGROUND ART

Polyolefins produced in a high pressure (HP) process are widely used in demanding polymer applications wherein the polymers must meet high mechanical and/or electrical requirements. For instance in power cable applications, particularly in medium voltage (MV) and especially in high voltage (HV) and extra high voltage (EHV) cable applications the electrical properties of the polymer composition has a significant importance. Furthermore, the requirement for the electrical properties may differ in different cable applications, as is the case between alternating current (AC) and direct current (DC) cable applications.

A typical power cable comprises a conductor surrounded, at least, by an inner semiconductive layer, an insulation layer and an outer semiconductive layer, in that order.

Space Charge

There is a fundamental difference between AC and DC with respect to electrical field distribution in the cable. The electric field in an AC cable is easily calculated since it depends on one material property only, namely the relative permittivity (the dielectric constant) with known temperature dependence. The electric field will not influence the dielectric constant. On the other hand, the electric field in a DC cable is much more complex and depends on the conduction, trapping and build-up of electric charges, so called space charges, inside the insulation. Space charges inside the insulation will distort the electric field and may lead to points of very high electric stress, possibly that high that a dielectric failure will follow.

Normally space charges are located close to the electrodes; charges of the same polarity as the nearby electrode are called homocharges, charges of opposite polarity are called heterocharges. The heterocharges will increase the electric field at this electrode, homocharges will instead reduce the electric field.

Tan δ (Dielectric Losses)

The tan δ and thus the dielectric losses (which are linearly proportional to the tan δ) shall be as low as possible for both technical and economical reasons:

Low losses means that low amount of transmitted electric energy is lost as thermal energy inside the cable insulation. These losses will mean economic losses for the power line operator.

Low losses will reduce the risk for thermal runaway, i.e. an unstable situation where the temperature of the insulation will increase due to the tan δ. When the temperature is increased, normally the tan δ will also increase. This will further increase the dielectric losses, and thus the temperature. The results will be a dielectric failure of the cable that needs to be replaced.

Compressor Lubricants

HP process is typically operated at high pressures up to 4000 bar. In known HP reactor systems the starting monomer(s) need to be compressed (pressurised) before introduced to the actual high pressure polymerisation reactor. Compressor lubricants are conventionally used in the hyper-compressor(s) for cylinder lubrication to enable the mechanically demanding compression step of starting monomer(s). It is well known that small amounts of the lubricant normally leaks through the seals into the reactor and mixes with the monomer(s). In consequence the reaction mixture contains traces (up to hundreds of ppm) of the compressor lubricant during the actual polymerisation step of the monomer(s). These traces of compressor lubricants can have an effect on the electrical properties of the final polymer.

As examples of commercial compressor lubricants e.g. polyalkylene glycol (PAG): $R-[C_xR_yH_z-O]_n-H$, wherein R can be H or straight chain or branched hydrocarbyl and x, y, x, n are independent integers that can vary in a known manner, and lubricants based on a mineral oil (by-product in the distillation of petroleum) can be mentioned. Compressor lubricants which are based on mineral oils that meet the requirements set for the white mineral oil in European Directive 2002/72/EC, Annex V, for plastics used in food contact, are used e.g. for polymerising polymers especially for the food and pharmaceutical industry. Such mineral oil-based lubricants contain usually lubricity additive(s) and may also contain other type of additive(s), such as antioxidants.

WO2009012041 of Dow discloses that in high pressure polymerisation process, wherein compressors are used for pressurising the reactants, i.e. one or more monomer(s), the compressor lubricant may have an effect on the properties of the polymerised polymer. The document describes the use of a polyol polyether which comprises one or none hydroxyl functionality as a compressor lubricant for preventing premature crosslinking particularly of silane-modified HP polyolefins. WO2009012092 of Dow discloses a composition which comprises a HP (i) polyolefin free of silane functionality and (ii) a hydrophobic polyether polyol of PAG type wherein at least 50% of its molecules comprise no more than a single hydroxyl functionality. The component (ii) appears to originate from a compressor lubricant. The composition is i.a. for W&C applications and is stated to reduce dielectrical losses in MV and HV power cables, see page 2, paragraph 0006. In both applications it is stated that hydrophilic groups (e.g. hydroxyl groups) present in the compressor lubricant can result in increased water uptake by the polymer which in turn can increase electrical losses or, respectively, premature scorch, when the polymer is used as a cable layer material. The problems are solved by a specific PAG type of lubricant with reduced amount of hydroxyl functionalities.

There is a continuous need in the polymer field to find polymers which are suitable for demanding polymer applications such as wire and cable applications with high requirements and stringent regulations.

SUMMARY

One of the objects of the present invention is to provide a polymer composition for use in an insulating layer of an alternating (AC) power cable with improved properties, as well as to an alternating (AC) power cable with improved properties.

The invention and further objects thereof are described and defined in details below.

DESCRIPTION OF CERTAIN ILLUSTRATIVE EMBODIMENTS

The invention is directed to a use of a polymer composition comprising a polyolefin and a crosslinking agent and wherein the polymer composition has a dielectric loss expressed as tan δ (50 Hz) of $12.0 \times 10^{-4}$ or less, when measured at 25 kV/mm and 130° C. according to "Test for Tan δ measurements on 10 kV cables" as described in the description part under "Determination methods", for producing an insulation layer of a MV, HV or EHV AC power cable, preferably of a HV or EHV AC power cable, comprising a first semiconductive composition, an insulation layer comprising a polymer composition, an outer semiconductive layer comprising a second semiconductive composition and optionally a jacketing layer comprising a jacketing composition, in that order.

Moreover, the invention is directed to an alternating current (AC) power cable, comprising a conductor surrounded by at least an inner semiconductive layer comprising a first semiconductive composition, an insulation layer comprising a polymer composition, an outer semiconductive layer comprising a second semiconductive composition and optionally a jacketing layer comprising a jacketing composition, in that order, wherein the polymer composition of the insulation layer comprises a polyolefin and a crosslinking agent, and wherein the polymer composition of the insulation layer has a dielectric loss expressed as tan δ (50 Hz) of $12.0 \times 10^{-4}$ or less, when measured at 25 kV/mm and 130° C. according to "Test for Tan δ measurements on 10 kV cables" as described in the description part under "Determination methods".

The cable of the invention is also referred herein shortly as "cable". The polymer composition of the insulation layer of the cable is also referred herein shortly as "Polymer composition" or "polymer composition". The term "tan δ" or "tan delta", as used herein, means tangent delta which is a well known measure of dielectric loss. As mentioned the method for determining tan delta is described below under "Determination methods".

The term "conductor" means herein above and below that the conductor comprises one or more wires. Moreover, the cable may comprise one or more such conductors. Preferably the conductor is an electrical conductor and comprises one or more metal wires.

The polymer composition of the insulation layer has surprisingly reduced dielectric losses expressed as tan delta at high temperature and high stress. Dielectric losses are due to both oscillation of dipoles (such as carbonyls) and conduction of free charge carriers (electrons, ions). The relative importance of these mechanisms depends on parameters such as temperature, electric field and frequency during the measurement. At room temperature and 50 Hz, the main contributor is clearly the dipoles. However, at temperatures above the melting point, especially under high electric field, the contribution from the free charge carriers has increased significantly.

The polymer composition with unexpectedly low dielectric losses at high stress and high temperatures has thus advantageously low conductivity and is highly suitable layer material in insulation layers of power cables, preferably of alternating (AC) power cables. Moreover the unexpectedly low dielectric losses are maintained even when the polymer composition is surrounded by the semiconductive layers.

The cable comprises preferably the jacketing layer. When the semiconductive layers and the insulation layer are combined with the optional, and preferable, jacketing layer, then superior AC power cable is obtained which is particularly suitable for use as a medium voltage (MV), high voltage (HV) or extra high voltage (EHV) AC power cable, more preferably as an AC power cable operating at any voltages, preferably at higher than 36 kV, most preferably as a HV or EHV AC power cable.

The polyolefin of the polymer composition is preferably produced in a high pressure (HP) process. As well known, the high pressure reactor system typically comprises a compression zone for a) compressing one or more starting monomer(s) in one or more compressor(s) which are also known as hyper-compressor(s), a polymerisation zone for b) polymerising the monomer(s) in one or more polymerisation reactor(s) and a recovery zone for c) separating unreacted products in one or more separators and for recovering the separated polymer. Moreover, the recovery zone of the HP reactor system typically comprises a mixing and pelletising section, such as pelletising extruder, after the separator(s), for recovering the separated polymer in form of pellets. The process is described in more details below.

Surprisingly, when a mineral oil is used in compressors for cylinder lubrication in a HP reactor system for compressing the starting monomer(s), then the resulting polyolefin has surprisingly low dielectric losses at high stress and high temperatures which contribute to the excellent electrical properties of the polymer composition in an insulation layer of the cable as stated above or below.

Compressor lubricant means herein a lubricant used in compressor(s), i.e. in hypercompressor(s), for cylinder lubrication.

More preferably the polymer composition of the insulation layer comprises a polyolefin and a crosslinking agent, and the polyolefin is obtainable by a high pressure process comprising (a) compressing one or more monomer(s) under pressure in a compressor, using a compressor lubricant for lubrication, (b) polymerising a monomer optionally together with one or more comonomer(s) in a polymerisation zone, (c) separating the obtained polyolefin from the unreacted products and recovering the separated polyolefin in a recovery zone, wherein in step a) the compressor lubricant comprises a mineral oil.

The resulting polymer composition has the above mentioned advantageous reduced dielectric losses at high temperatures and high stress.

The expressions "obtainable by the process" or "produced by the process" are used herein interchangeably and mean the category "product by process", i.e. that the product has a technical feature which is due to the preparation process.

Accordingly it is more preferable that the insulation layer of the cable comprises a polymer composition which has a dielectric loss expressed as tan δ (50 Hz) of $12.0 \times 10^{-4}$ or less, when measured at 25 kV/mm and 130° C. according to "Test for Tan δ measurements on 10 kV cables" as described below under "Determination methods"; and wherein the polyolefin of the polymer composition is obtainable by a high pressure process comprising (a) compressing one or more monomer(s) under pressure in a compressor, using a compressor lubricant for lubrication,
(b) polymerising a monomer optionally together with one or more comonomer(s) in a polymerisation zone,
(c) separating the obtained polyolefin from the unreacted products and recovering the separated polyolefin in a recovery zone, wherein in step a) the compressor lubricant comprises a mineral oil.

Even more preferably the polymer composition of the insulation layer has a dielectric loss expressed as tan δ (50 Hz) of $12.0 \times 10^{-4}$ or less, preferably of $11.0 \times 10^{-4}$ or less, preferably of $0.01\text{-}10.0 \times 10^{-4}$, more preferably of $0.1\text{-}9.0 \times 10^{-4}$, more preferably of $0.3\text{-}8.0 \times 10^{-4}$, more preferably of $0.5\text{-}7.0 \times 10^{-4}$, when measured at 25 kV/mm and 130° C. according to "Test for Tan δ measurements on 10 kV cables" as described below under "Determination methods".

In a more preferable embodiment of the cable, at least the polymer composition of the insulation layer is crosslinkable and is crosslinked in the presence of the crosslinking agent before the end use application of the cable.

"Crosslinkable" means that the polymer composition can be crosslinked using a crosslinking agent(s) before the use in the end application thereof. Crosslinkable polymer composition comprises the polyolefin and the crosslinking agent. It is preferred that the polyolefin of the polymer composition is crosslinked. The crosslinking of the polymer composition is carried out at least with the crosslinking agent of the polymer composition of the invention. Moreover, the crosslinked polymer composition or, respectively, the crosslinked polyolefin, is most preferably crosslinked via radical reaction with a free radical generating agent. The crosslinked polymer composition has a typical network, i.e. interpolymer crosslinks (bridges), as well known in the field. As evident for a skilled person, the crosslinked polymer can be and is defined herein with features that are present in the polymer composition or polyolefin before or after the crosslinking, as stated or evident from the context. For instance the presence of the crosslinking agent in the polymer composition or the type and compositional property, such as MFR, density and/or unsaturation degree, of the polyolefin component are defined, unless otherwise stated, before crosslinking, and the features after the crosslinking are e.g. the electrical property or crosslinking degree measured from the crosslinked polymer composition.

The preferred crosslinking agent of teh polymer composition is a free radical generating agent(s), more preferably a peroxide(s).

Accordingly, the present preferable crosslinked polymer composition is obtainable by crosslinking with peroxide as defined above or below. The expressions "obtainable by crosslinking", "crosslinked with" and "crosslinked polymer composition" are used herein interchangeably and mean that the crosslinking step provides a further technical feature to the polymer composition as will be explained below.

It is evident to a skilled person that the cable can optionally comprise one or more other layer(s) comprising one or more screen(s), a jacketing layer(s) or other protective layer(s), which layer(s) are conventionally used in of W&C field.

The below preferable subgroups, properties and embodiments of the polymer composition, the first semiconductive composition, second semiconductive composition and jacketing composition prior or after any optional crosslinking apply equally and independently to the compositions and layers as such, as well as to the crosslinkable cable and the crosslinked cable, as defined above or below.

Preferably, the polymer composition comprises the crosslinking agent, preferably peroxide, in an amount of less than 10 wt %, less than 6 wt %, more preferably of less than 5 wt %, less than 3.5 wt %, even more preferably from 0.1 wt % to 3 wt %, and most preferably from 0.2 wt % to 2.6 wt %, based on the total weight of the polymer composition.

Peroxide is the preferred crosslinking agent. Non-limiting examples are organic peroxides, such as di-tert-amylperoxide, 2,5-di(tert-butylperoxy)-2,5-dimethyl-3-hexyne, 2,5-di(tert-butylperoxy)-2,5-dimethylhexane, tert-butylcumylperoxide, di(tert-butyl)peroxide, dicumylperoxide, butyl-4,4-di(tert-butylperoxy)-valerate, 1,1-di(tert-butylperoxy)-3,3,5-trimethylcyclohexane, tert-butylperoxybenzoate, dibenzoylperoxide, di(tert butylperoxyisopropyl)benzene, 2,5-dimethyl-2,5-di(benzoylperoxy)hexane, 1,1-di(tert-butylperoxy)cyclohexane, 1,1-di(tert amylperoxy)cyclohexane, or any mixtures thereof. Preferably, the peroxide is selected from 2,5-di(tert-butylperoxy)-2,5-dimethylhexane, di(tert-butylperoxyisopropyl)benzene, dicumylperoxide, tert-butylcumylperoxide, di(tert-butyl)peroxide, or mixtures thereof. Most preferably, the peroxide is dicumylperoxide.

In addition to crosslinking agent(s) the polymer composition with the advantageous electrical properties may comprise further component(s), such as further polymer component(s) and/or one or more additive(s). As optional additives the polymer composition may contain antioxidant(s), stabiliser(s), water tree retardant additive(s), processing aid(s), scorch retarder(s), metal deactivator(s), crosslinking booster(s), flame retardant additive(s), acid or ion scavenger(s), inorganic filler(s), voltage stabilizer(s) or any mixtures thereof.

In a more preferable embodiment the polymer composition comprises one or more antioxidant(s) and optionally one or more scorch retarder(s) (SR).

As non-limiting examples of antioxidants e.g. sterically hindered or semi-hindered phenols, aromatic amines, aliphatic sterically hindered amines, organic phosphites or phosphonites, thio compounds, and mixtures thereof, can be mentioned. As non-limiting examples of thio compounds, for instance 1. sulphur containing phenolic antioxidant(s), preferably selected from thiobisphenol(s), the most preferred being 4,4'-thiobis (2-tertbutyl-5-methylphenol) (CAS number: 96-69-5), 2,2'-thiobis (6-t-butyl-4-methylphenol), 4,4'-thiobis (2-methyl-6-t-butylphenol), thiodiethylene bis[3-(3,5-di-tert-butyl-4-hydroxyphenyl)propionate, or 4,6-bis (octylthiomethyl)-o-cresol (CAS: 110553-27-0) or derivatives thereof; or any mixtures thereof,
2. Other thio compounds like di-stearyl-thio-dipropionate or similar compounds with various length on the carbon chains; or mixtures thereof,
3. or any mixtures of 1) and 2).

Group 1) above is the preferred antioxidant(s).

In this preferable embodiment the amount of an antioxidant is preferably from 0.005 to 2.5 wt-% based on the weight of the Polymer composition. The antioxidant(s) are preferably added in an amount of 0.005 to 2.0 wt-%, more preferably 0.01 to 1.5 wt-%, even more preferably 0.03 to 0.8 wt-%, even more preferably 0.04 to 0.8 wt-% based on the weight of the polymer composition.

In a further preferable embodiment the polymer composition comprises at least one or more antioxidant(s) and one or more scorch retarder(s).

The scorch retarder (SR) is well known additive type in the field and can i.a. prevent premature crosslinking. As also known the SRs may also contribute to the unsaturation level of the polymer composition. As examples of scorch retarders, allyl compounds, such as dimers of aromatic alpha-methyl alkenyl monomers, preferably 2,4-di-phenyl-4-methyl-1-pentene, substituted or unsubstituted diphenylethylenes, quinone derivatives, hydroquinone derivatives, monofunctional vinyl containing esters and ethers, monocyclic hydrocarbons having at least two or more double bonds, or mixtures thereof, can be mentioned. Preferably, the amount of a scorch retarder is within the range of 0.005 to 2.0 wt.-%, more preferably within the range of 0.005 to 1.5 wt.-%, based on the weight of the Polymer composition. Further preferred ranges are e.g. from 0.01 to 0.8 wt %, 0.02 to 0.75 wt %, 0.02 to 0.70 wt %, or 0.03 to 0.60 wt %, based on the weight of the polymer composition. Preferred SR of the polymer composition is 2,4-Diphenyl-4-methyl-1-pentene (CAS number 6362-80-7).

The polymer composition of the invention comprises typically at least 50 wt %, preferably at least 60 wt %, more preferably at least 70 wt %, more preferably at least 75 wt %, more preferably from 80 to 100 wt % and more preferably from 85 to 100 wt %, of the polyolefin based on the total weight of the polymer component(s) present in the polymer composition. The preferred polymer composition consists of polyolefin as the only polymer component. The expression means that the polymer composition does not contain further polymer components, but the polyolefin as the sole polymer component. However, it is to be understood herein that the polymer composition may comprise further component(s) other than polymer components, such as additive(s) which may optionally be added in a mixture with a carrier polymer, i.e. in so called master batch.

In an even more preferable embodiment of the cable, at least the first semiconductive composition of the inner semiconductive layer and the polymer composition of the insulation layer are crosslinked before the end use application of the cable. Also the jacketing composition of the optional, and preferable, jacketing layer may be crosslinked.

Moreover, each of the first and second semiconductive compositions and the optional, and preferable, jacketing composition, when crosslinked, may comprise any crosslinking agent and is preferably crosslinked in a conventional manner using conventional amounts of the used crosslinking agent. For instance any of the semiconductive compositions or the optional, and preferable, jacketing composition can be crosslinkable by a peroxide or via crosslinkable groups, such as via hydrolysable silane groups. Peroxide is preferably used in the above given amounts. The hydrolysable silane groups may be introduced into the polymer of the composition by copolymerisation of olefin, preferably ethylene, monomer(s) with silane group containing comonomers or by grafting the polymer with silane groups containing compounds, i.e. by chemical modification of the polymer by addition of silane groups mostly in a radical reaction. Such silane groups containing comonomers and compounds are well known in the field and e.g. commercially available. The hydrolysable silane groups are typically then crosslinked by hydrolysis and subsequent condensation in the presence of a silanol-condensation catalyst and $H_2O$ in a manner known in the art. Also silane crosslinking technique is well known in the art.

The invention is directed also to a process for producing a crosslinkable and crosslinked alternating current (AC) power cable, as defined above or below, using the polymer composition of the invention.

Polyolefin Component of the Polymer Composition of the Insulation Layer of the Cable The following preferable embodiments, properties and subgroups of the polyolefin component suitable for the polymer composition are generalisable so that they can be used in any order or combination to further define the preferable embodiments of the polymer composition. Moreover, it is evident that the given description applies to the polyolefin before it is crosslinked.

The term polyolefin means both an olefin homopolymer and a copolymer of an olefin with one or more comonomer (s). As well known "comonomer" refers to copolymerisable comonomer units.

The polyolefin can be any polyolefin, such as a conventional polyolefin, which is suitable as a polymer in an insulating layer, of the AC power cable.

The polyolefin can be e.g. a commercially available polymer or can be prepared according to or analogously to known polymerization process described in the chemical literature. More preferably the polyolefin is a polyethylene produced in a high pressure process, more preferably a low density polyethylene LDPE produced in a high pressure process. The meaning of LDPE polymer is well known and documented in the literature. Although the term LDPE is an abbreviation for low density polyethylene, the term is understood not to limit the density range, but covers the LDPE-like HP polyethylenes with low, medium and higher densities. The term LDPE describes and distinguishes only the nature of HP polyethylene with typical features, such as different branching architecture, compared to the PE produced in the presence of an olefin polymerisation catalyst.

The LDPE as said polyolefin mean a low density homopolymer of ethylene (referred herein as LDPE homopolymer) or a low density copolymer of ethylene with one or more comonomer(s) (referred herein as LDPE copolymer). The one or more comonomers of LDPE copolymer are preferably selected from the polar comonomer(s), non-polar comonomer(s) or from a mixture of the polar comonomer(s) and non-polar comonomer(s), as defined above or below. Moreover, said LDPE homopolymer or LDPE copolymer as said polyolefin may optionally be unsaturated.

As a polar comonomer for the LDPE copolymer as said polyolefin, comonomer(s) containing hydroxyl group(s), alkoxy group(s), carbonyl group(s), carboxyl group(s), ether group(s) or ester group(s), or a mixture thereof, can be used. More preferably, comonomer(s) containing carboxyl and/or ester group(s) are used as said polar comonomer. Still more preferably, the polar comonomer(s) of LDPE copolymer is selected from the groups of acrylate(s), methacrylate(s) or acetate(s), or any mixtures thereof. If present in said LDPE copolymer, the polar comonomer(s) is preferably selected from the group of alkyl acrylates, alkyl methacrylates or vinyl acetate, or a mixture thereof. Further preferably, said polar comonomers are selected from $C_1$- to $C_6$-alkyl acrylates, $C_1$- to $C_6$-alkyl methacrylates or vinyl acetate. Still more preferably, said polar LDPE copolymer is a copolymer of ethylene with $C_1$- to $C_4$-alkyl acrylate, such as methyl, ethyl, propyl or butyl acrylate, or vinyl acetate, or any mixture thereof.

As the non-polar comonomer(s) for the LDPE copolymer as said polyolefin, comonomer(s) other than the above defined polar comonomers can be used. Preferably, the non-polar comonomers are other than comonomer(s) containing hydroxyl group(s), alkoxy group(s), carbonyl group(s), carboxyl group(s), ether group(s) or ester group(s). One group of preferable non-polar comonomer(s) comprise, preferably consist of, monounsaturated (=one double bond)

comonomer(s), preferably olefins, preferably alpha-olefin(s), more preferably $C_3$ to $C_{10}$ alpha-olefin(s), such as propylene, 1-butene, 1-hexene, 4-methyl-1-pentene, styrene, 1-octene, 1-nonene; polyunsaturated (=more than one double bond) comonomer(s); a silane group containing comonomer(s); or any mixtures thereof. The polyunsaturated comonomer(s) are further described below in relation to unsaturated LDPE copolymers.

If the LDPE polymer is a copolymer, it preferably comprises 0.001 to 50 wt.-%, more preferably 0.05 to 40 wt.-%, still more preferably less than 35 wt.-%, still more preferably less than 30 wt.-%, more preferably less than 25 wt.-%, of one or more comonomer(s). The Polymer composition, preferably the polyolefin component thereof, more preferably the LDPE polymer, may optionally be unsaturated, i.e. the polymer composition, preferably the polyolefin, preferably the LDPE polymer, may comprise vinyl groups. The "unsaturated" means herein that the polymer composition, preferably the polyolefin, contains vinyl groups/1000 carbon atoms in a total amount of at least 0.04/1000 carbon atoms. In general, "vinyl group" means herein $CH_2$=CH— moiety.

As well known the unsaturation can be provided to the polymer composition i.a. by means of the polyolefin, a low molecular weight (Mw) compound(s), such as crosslinking booster(s) or scorch retarder additive(s), or any combinations thereof. If two or more above sources of vinyl groups are chosen to be used for providing the unsaturation, then the total amount of vinyl groups in the polymer composition means the sum of the vinyl groups present in the vinyl group sources. The content of the vinyl groups is determined according to description part of the "Method for determination of the amount of double bonds in the polymer composition or in a polymer" under the "Determination methods" which relates to measurement of the vinyl group content.

Any vinyl group measurements are carried out prior to crosslinking.

If the Polymer composition is unsaturated prior to crosslinking, then it is preferred that the unsaturation originates at least from an unsaturated polyolefin component. More preferably, the unsaturated polyolefin is an unsaturated polyethylene, more preferably an unsaturated LDPE polymer, even more preferably an unsaturated LDPE homopolymer or an unsaturated LDPE copolymer. When polyunsaturated comonomer(s) are present in the LDPE polymer as said unsaturated polyolefin, then the LDPE polymer is an unsaturated LDPE copolymer.

If an LDPE homopolymer is unsaturated, then the unsaturation can be provided e.g. by a chain transfer agent (CTA), such as propylene, and/or by polymerization conditions. If an LDPE copolymer is unsaturated, then the unsaturation can be provided by one or more of the following means: by a chain transfer agent (CTA), by one or more polyunsaturated comonomer(s) or by polymerisation conditions. It is well known that selected polymerisation conditions such as peak temperatures and pressure, can have an influence on the unsaturation level. In case of an unsaturated LDPE copolymer, it is preferably an unsaturated LDPE copolymer of ethylene with at least one polyunsaturated comonomer, and optionally with other comonomer(s), such as polar comonomer(s) which is preferably selected from acrylate or acetate comonomer(s).

The polyunsaturated comonomers suitable for the unsaturated polyolefin preferably consist of a straight carbon chain with at least 8 carbon atoms and at least 4 carbons between the non-conjugated double bonds, of which at least one is terminal, more preferably, said polyunsaturated comonomer is a diene, preferably a diene which comprises at least eight carbon atoms, the first carbon-carbon double bond being terminal and the second carbon-carbon double bond being non-conjugated to the first one. Preferred dienes are selected from $C_8$ to $C_{14}$ non-conjugated dienes or mixtures thereof, more preferably selected from 1,7-octadiene, 1,9-decadiene, 1,11-dodecadiene, 1,13-tetradecadiene, 7-methyl-1,6-octadiene, 9-methyl-1,8-decadiene, or mixtures thereof. Even more preferably, the diene is selected from 1,7-octadiene, 1,9-decadiene, 1,11-dodecadiene, 1,13-tetradecadiene, or any mixture thereof, however, without limiting to above dienes.

It is well known that e.g. propylene can be used as a comonomer or as a chain transfer agent (CTA), or both, whereby it can contribute to the total amount of the C—C double bonds, preferably to the total amount of the vinyl groups. Herein, when a compound which can also act as comonomer, such as propylene, is used as CTA for providing double bonds, then said copolymerisable comonomer is not calculated to the comonomer content.

If the polyolefin, more preferably the LDPE polymer, is unsaturated, then it has preferably the total amount of vinyl groups is preferably higher than 0.05/1000 carbon atoms, still more preferably higher than 0.08/1000 carbon atoms, still more preferably of higher than 0.11/1000 carbon atoms and most preferably of higher than 0.15/1000 carbon atoms. Preferably, the total amount of vinyl groups is of lower than 4.0/1000 carbon atoms. In some embodiments even higher unsaturation is desired, then the polyolefin, prior to crosslinking, contains preferably vinyl groups in total amount of more than 0.20/1000 carbon atoms, more preferably more than 0.25/1000 carbon atoms, still more preferably of more than 0.30/1000 carbon atoms. The higher vinyl group amounts are preferably provided by an unsaturated LDPE copolymer of ethylene with at least one polyunsaturated comonomer.

The preferred polyolefin for use in the Polymer composition is a saturated LDPE homopolymer or a saturated LDPE copolymer of ethylene with one or more comonomer(s) or an unsaturated LDPE polymer, which is selected from an unsaturated LDPE homopolymer or an unsaturated LDPE copolymer of ethylene with one or more comonomer(s), preferably with at least one polyunsaturated comonomer.

Typically, and preferably in W&C applications, the density of the polyolefin, preferably of the LDPE polymer, is higher than 860 kg/m$^3$. Preferably the density of the polyolefin, preferably of the LDPE polymer, the ethylene homo- or copolymer is not higher than 960 kg/m$^3$, and preferably is from 900 to 945 kg/m$^3$. The MFR$_2$ (2.16 kg, 190° C.) of the polyolefin, preferably of the LDPE polymer, is preferably from 0.01 to 50 g/10 min, more preferably is from 0.1 to 20 g/10 min, and most preferably is from 0.2 to 10 g/10 min.

Compressor Lubricant

The compressor lubricant used in the polymerization process for producing the preferred polyolefin of the Polymer composition comprises mineral oil which is a known petroleum product.

Mineral oils have a well known meaning and are used i.a. for lubrication in commercial lubricants. "Compressor lubricant comprising a mineral oil" and "mineral oil-based compressor lubricants" are used herein interchangeably.

Mineral oil can be a synthetic mineral oil which is produced synthetically or a mineral oil obtainable from crude oil refinery processes.

Typically, mineral oil, known also as liquid petroleum, is a by-product in the distillation of petroleum to produce gasoline and other petroleum based products from crude oil.

The mineral oil of the compressor lubricant of the invention is preferably a paraffinic oil. Such paraffinic oil is derived from petroleum based hydrocarbon feedstocks.

Mineral oil is preferably the base oil of the compressor lubricant. The compressor lubricant may comprise other components, such as lubricity additive(s), viscosity builders, antioxidants, other additive(s) or any mixtures thereof, as well known in the art.

More preferably, the compressor lubricant comprises a mineral oil which is conventionally used as compressor lubricants for producing plastics, e.g. LDPE, for food or medical industry, more preferably the compressor lubricant comprises a mineral oil which is a white oil. Even more preferably the compressor lubricant comprises white oil as the mineral oil and is suitable for the production of polymers for food or medical industry. White oil has a well known meaning. Moreover such white oil based compressor lubricants are well known and commercially available. Even more preferably the white oil meets the requirements for a food or medical white oil.

As, known, the mineral oil, preferably the white mineral oil of the preferred compressor lubricant contains paraffinic hydrocarbons.

Even more preferably, of the compressor lubricant meets one or more of the below embodiments:
In one preferable embodiment, the mineral oil, preferably the white mineral oil, of the compressor lubricant has a viscosity of at least $8.5 \times 10^{-6}$ m$^2$/s at 100° C.;
In a second preferable embodiment, the mineral oil, preferably the white mineral oil, of the compressor lubricant contains 5% per weight (wt %) or less of hydrocarbons with less than 25 carbon atoms;
In a third preferable embodiment, the hydrocarbons of the mineral oil, preferably of the white mineral oil, of the compressor lubricant have an average molecular weight (Mw) of 480 or more.

The above "amount of hydrocarbons", "viscosity" and "Mw" are preferably in accordance with the above European Directive 2002/72/EC of 6 Aug. 2002.

It is preferred that the compressor lubricant is according to each of the above three embodiments 1-3.

The most preferred compressor lubricant of the invention meets the requirements given for white mineral oil in European Directive 2002/72/EC of 6 Aug. 2002, Annex V, for plastics used in food contact. Directive is published e.g. in L 220/18 EN Official Journal of the European Communities 15.8.2002. Accordingly the mineral oil is most preferably a white mineral oil which meets said European Directive 2002/72/EC of 6 Aug. 2002, Annex V. Moreover it is preferred that the compressor lubricant complies with said European Directive 2002/72/EC of 6 Aug. 2002.

The compressor lubricant of the invention can be a commercially available compressor lubricant or can be produced by conventional means, and is preferably a commercial lubricant used in high pressure polymerisation processes for producing plastics for medical or food applications. Non-exhaustive examples of preferable commercially available compressor lubricants are e.g. Exxcolub R Series compressor lubricant for production of polyethylene used in food contact and supplied i.a. by ExxonMobil, Shell Corena for producing polyethylene for pharmaceutical use and supplied by Shell, or CL-1000-SONO-EU, supplied by Sonneborn.

The compressor lubricant contains preferably no polyalkyleneglycol based components.

It is preferred that any mineral oil present in the Polymer composition of the invention originates from the compressor lubricant used in the process equipment during the polymerisation process of the polyolefin. Accordingly, it is preferred that no mineral oil is added to the Polymer composition or to the polyolefin after the polymerisation thereof.

Traces of the mineral oil originating from the compressor lubricant and present, if any, in the produced polyolefin would typically amount in maximum of up to 0.4 wt % based on the amount of the polyolefin. The given limit is the absolute maximum based on the calculation of the worst scenario where all the lost compressor lubricant (average leakage) would go to the final polyolefin. Such worst scenario is unlikely and normally the resulting polyolefin contains clearly lower level of the mineral oil.

The compressor lubricant of the invention is used in a conventional manner and well known to a skilled person for the lubrication of the compressor(s) in the compressing step (a) of the invention.

Process

The high pressure (HP) process is the preferred process for producing a polyolefin of the Polymer composition, preferably a low density polyethylene (LDPE) polymer selected from LDPE homopolymer or LDPE copolymer of ethylene with one or more comonomers.

The invention further provides a process for polymerising a polyolefin in a high pressure process which comprises the steps of:
(a) compressing one or more monomer(s) under pressure in a compressor, wherein a compressor lubricant is used for lubrication,
(b) polymerising a monomer optionally together with one or more comonomer(s) in a polymerisation zone(s),
(c) separating the obtained polyolefin from the unreacted products and recovering the separated polyolefin in a recovery zone,
wherein in step a) a compressor lubricant comprises a mineral oil including the preferable embodiments thereof.

Accordingly, the polyolefin of the invention is preferably produced at high pressure by free radical initiated polymerisation (referred to as high pressure radical polymerization). The preferred polyolefin is LDPE homopolymer or LDPE copolymer of ethylene with one or more comonomer(s), as defined above. The LDPE polymer obtainable by the process of the invention preferably provides the advantageous electrical properties as defined above or below. The high pressure (HP) polymerisation and the adjustment of process conditions for further tailoring the other properties of the polyolefin depending on the desired end application are well known and described in the literature, and can readily be used by a skilled person.

Compression Step a) of the Process of the Invention:

Monomer, preferably ethylene, with one or more optional comonomer(s), is fed to one or more compressor at compressor zone to compress the monomer(s) up to the desired polymerization pressure and to enable handling of high amounts of monomer(s) at controlled temperature. Typical compressors, i.e. hyper-compressors, for the process can be piston compressors or diaphragm compressors. The compressor zone usually comprises one or more compressor(s), i.e. hyper-compressor(s), which can work in series or in parallel. The compressor lubricant of the invention is used for cylinder lubrication in at least one, preferably in all of the hyper-compressor(s), present in the compressor zone. The compression step a) comprises usually 2-7 compression steps, often with intermediate cooling zones. Temperature is typically low, usually in the range of less than 200° C., preferably of less than 100° C. Any recycled monomer, preferably ethylene, and optional comonomer(s) can be added at feasible points depending on the pressure.

Polymerisation Step b) of the Process:

Preferred high pressure polymerisation is effected at a polymerisation zone which comprises one or more polymerisation reactor(s), preferably at least a tubular reactor or an autoclave reactor, preferably a tubular reactor. The polymerization reactor(s), preferably a tubular reactor, may comprise one or more reactor zones, wherein different polymerization conditions may occur and/or adjusted as well known in the HP field. One or more reactor zone(s) are provided in a known manner with means for feeding monomer and optional comonomer(s), as well as with means for adding initiator(s) and/or further components, such as CTA(s). Additionally, the polymerization zone may comprise a preheating section which is preceding or integrated to the polymerization reactor. In one preferable HP process the monomer, preferably ethylene, optionally together with one or more comonomer(s) is polymerized in a preferable tubular reactor, preferably in the presence of chain transfer agent(s).

Tubular Reactor:

The reaction mixture is fed to the tubular reactor. The tubular reactor may be operated as a single-feed system (also known as front feed), wherein the total monomer flow from the compressor zone is fed to the inlet of the first reaction zone of the reactor. Alternatively the tubular reactor may be a multifeed system, wherein e.g the monomer(s), the optional comonomer(s) or further component(s) (like CTA(S)) coming from the compression zone, separately or in any combinations, is/are split to two or more streams and the split feed(s) is introduced to the tubular reactor to the different reaction zones along the reactor. For instance 10-90% of the total monomer quantity is fed to the first reaction zone and the other 90-10% of the remaining monomer quantity is optionally further split and each split is injected at different locations along the reactor. Also the feed of initiator(s) may be split in two or more streams. Moreover, in a multifeed system the split streams of monomer (/comonomer) and/or optional further component(s), such as CTA, and, respectively, the split streams of initiator(s) may have the same or different component(s) or concentrations of the components, or both.

The single feed system for the monomer and optional comonomer(s) is preferred in the tubular reactor for producing the polyolefin of the invention.

First part of the tubular reactor is to adjust the temperature of the feed of monomer, preferably ethylene, and the optional comonomer(s); usual temperature is below 200° C., such as 100-200° C. Then the radical initiator is added. As the radical initiator, any compound or a mixture thereof that decomposes to radicals at an elevated temperature can be used. Usable radical initiators, such as peroxides, are commercially available. The polymerization reaction is exothermic. There can be several radical initiator injections points, e.g. 1-5 points, along the reactor usually provided with separate injection pumps. As already mentioned also the monomer, preferably ethylene, and optional comonomer(s), is added at front and optionally the monomer feed(s) can be split for the addition of the monomer and/or optional comonomer(s), at any time of the process, at any zone of the tubular reactor and from one or more injection point(s), e.g. 1-5 point(s), with or without separate compressors.

Furthermore, one or more CTA(s) are preferably used in the polymerization process of the Polyolefin. Preferred CTA(s) can be selected from one or more non-polar and one or more polar CTA(s), or any mixtures thereof.

Non-polar CTA, if present, is preferably selected from
i) one or more compound(s) which does not contain a polar group selected from nitrile (CN), sulfide, hydroxyl, alkoxy, aldehyl (HC=0), carbonyl, carboxyl, ether or ester group(s), or mixtures thereof. Non-polar CTA is preferably selected from one or more non-aromatic, straight chain branched or cyclic hydrocarbyl(s), optionally containing a hetero atom such as O, N, S, Si or P. More preferably the non-polar CTA(s) is selected from one or more cyclic alpha-olefin(s) of 5 to 12 carbon or one or more straight or branched chain alpha-olefin(s) of 3 to 12 carbon atoms, more preferably from one or more straight or branched chain alpha-olefin(s) of 3 to 6 carbon atoms. The preferred non-polar CTA is propylene.

The polar CTA, if present, is preferably selected from
i) one or more compound(s) comprising one or more polar group(s) selected from nitrile (CN), sulfide, hydroxyl, alkoxy, aldehyl (HC=O), carbonyl, carboxyl, ether or ester group(s), or mixtures thereof;
ii) one or more aromatic organic compound(s), or
iii) any mixture thereof.

Preferably any such polar CTA(s) have up to 12 carbon atoms, e.g. up to 10 carbon atoms preferably up to 8 carbon atoms. A preferred option includes a straight chain or branched chain alkane(s) having up to 12 carbon atoms (e.g. up to 8 carbon atoms) and having at least one nitrile (CN), sulfide, hydroxyl, alkoxy, aldehyl (HC=O), carbonyl, carboxyl or ester group.

More preferably the polar CTA(s), if present, is selected from i) one or more compound(s) containing one or more hydroxyl, alkoxy, HC=O, carbonyl, carboxyl and ester group(s), or a mixture thereof, more preferably from one or more alcohol, aldehyde and/or ketone compound(s). The preferred polar CTA(s), if present, is a straight chain or branched chain alcohol(s), aldehyde(s) or ketone(s) having up to 12 carbon atoms, preferably up to 8 carbon atoms, especially up to 6 carbon atoms, most preferably, isopropanol (IPA), methylethylketone (MEK) and/or propionaldehyde (PA).

The amount of the preferable CTA(s) is not limited and can be tailored by a skilled person within the limits of the invention depending on the desired end properties of the final polymer. Accordingly, the preferable chain transfer agent(s) can be added in any injection point of the reactor to the polymer mixture. The addition of one or more CTA(s) can be effected from one or more injection point(s) at any time during the polymerization.

In case the polymerization of the polyolefin is carried out in the presence of a CTA mixture comprising one or more polar CTA(s) as defined above and one or more non-polar CTA(s) as defined above, then the feed ratio by weight % of polar CTA to non-polar CTA is preferably
1 to 99 wt % of polar CTA and
1 to 99 wt % of non-polar CTA, based on the combined amount of the feed of polar CTA and the non-polar CTA into the reactor.

The addition of monomer, comonomer(s) and optional CTA(s) may include and typically includes fresh and recycled feed(s).

The reactor is continuously cooled e.g. by water or steam. The highest temperature is called peak temperature and the reaction starting temperature is called initiation temperature.

Suitable temperatures range up to 400° C., preferably from 80 to 350° C. and pressure from 700 bar, preferably 1000 to 4000 bar, more preferably from 1000 to 3500 bar. Pressure can be measured at least after compression stage and/or after the tubular reactor. Temperature can be measured at several points during all steps. High temperature and high pressure generally increase output. Using various temperature profiles selected by a person skilled in the art will allow control of structure of polymer chain, i.e. Long Chain Branching and/or Short Chain branching, density, branching factor, distribution of comonomers, MFR, viscosity, Molecular Weight Distribution etc.

The reactor ends conventionally with a valve a so-called production control valve. The valve regulates reactor pressure and depressurizes the reaction mixture from reaction pressure to separation pressure.

Recovering Step c) of the Process:

Separation:

The pressure is typically reduced to approx 100 to 450 bar and the reaction mixture is fed to a separator vessel where most of the unreacted, often gaseous, products are removed from the polymer stream. Unreacted products comprise e.g. monomer or the optional comonomer(s), and most of the unreacted components are recovered. The polymer stream is optionally further separated at lower pressure, typically less than 1 bar, in a second separator vessel where more of the unreacted products are recovered. Normally low molecular compounds, i.e. wax, are removed from the gas. The gas is usually cooled and cleaned before recycling.

Recovery of the Separated Polymer:

After the separation the obtained polymer is typically in a form of a polymer melt which is normally mixed and pelletized in a pelletising section, such as pelletising extruder, arranged in connection to the HP reactor system. Optionally, additive(s), such as antioxidant(s), can be added in this mixer in a known manner to result in the Polymer composition.

Further details of the production of ethylene (co)polymers by high pressure radical polymerization can be found i.a. in the Encyclopedia of Polymer Science and Engineering, Vol. 6 (1986), pp 383-410 and Encyclopedia of Materials: Science and Technology, 2001 Elsevier Science Ltd.: "Polyethylene: High-pressure, R. Klimesch, D. Littmann and F.-O. Mailing pp. 7181-7184.

As to polymer properties, e.g. MFR, of the polymerised Polymer, preferably LDPE polymer, the properties can be adjusted by using e.g. chain transfer agent during the polymerisation, or by adjusting reaction temperature or pressure (which also to a certain extent have an influence on the unsaturation level).

When an unsaturated LDPE copolymer of ethylene is prepared, then, as well known, the C—C double bond content can be adjusted by polymerising the ethylene e.g. in the presence of one or more polyunsaturated comonomer(s), chain transfer agent(s), process conditions, or any combinations thereof, e.g. using the desired feed ratio between monomer, preferably ethylene, and polyunsaturated comonomer and/or chain transfer agent, depending on the nature and amount of C—C double bonds desired for the unsaturated LDPE copolymer. I.a. WO 9308222 describes a high pressure radical polymerisation of ethylene with polyunsaturated monomers, such as an α,ω-alkadienes, to increase the unsaturation of an ethylene copolymer. The non-reacted double bond(s) thus provides i.a. pendant vinyl groups to the formed polymer chain at the site, where the polyunsaturated comonomer was incorporated by polymerization. As a result the unsaturation can be uniformly distributed along the polymer chain in random copolymerisation manner. Also e.g. WO 9635732 describes high pressure radical polymerisation of ethylene and a certain type of polyunsaturated α,ω-divinylsiloxanes. Moreover, as known, e.g. propylene can be used as a chain transfer agent to provide said double bonds.

First and Second Semiconductive Compositions of the Cable

The first and second semiconductive compositions can be different or identical and the following preferred embodiments of the semiconductive composition apply independently to each of them.

The semiconductive composition comprises preferably a polyolefin (S) and a conductive filler.

A suitable polyolefin (S) can be any polyolefin, such as any conventional polyolefin, which can be used for producing a semiconductive cable layer of a cable, of the present invention. For instance such suitable conventional polyolefins are as such well known and can be e.g. commercially available or can be prepared according to or analogously to known polymerization processes described in the chemical literature.

The polyolefin (S) for the polymer composition is preferably selected from a polypropylene (PP) or polyethylene (PE), preferably from a polyethylene. For polyethylene, ethylene will form the major monomer content present in any polyethylene polymer.

Preferable polyolefin (S) is a polyethylene produced in the presence of an olefin polymerisation catalyst or a polyethylene produced in a high pressure process.

In case a polyolefin (S) is a copolymer of ethylene with at least one comonomer, then such comonomer(s) is selected from non-polar comonomer(s) or polar comonomers, or any mixtures thereof. Preferable optional non-polar comonomers and polar comonomers are described below in relation to polyethylene produced in a high pressure process. These comonomers can be used in any polyolefin (S) of the invention.

"Olefin polymerisation catalyst" means herein preferably a conventional coordination catalyst. It is preferably selected from a Ziegler-Natta catalyst, single site catalyst which term comprises a metallocene and a non-metallocene catalyst, or a chromium catalyst, or any mixture thereof. The terms have a well known meaning.

Polyethylene polymerised in the presence of an olefin polymerisation catalyst is also often called as "low pressure polyethylene" to distinguish it clearly from polyethylene produced in a high pressure. Both expressions are well known in the polyolefin field. Low pressure polyethylene can be produced in polymerisation process operating i.a. in bulk, slurry, solution, or gas phase conditions or in any combinations thereof. The olefin polymerisation catalyst is typically a coordination catalyst as defined above.

More preferably, the polyolefin (S) is selected from a homopolymer or a copolymer of ethylene produced in the presence of a coordination catalyst or produced in a high pressure polymerisation process.

Where the polyolefin (S) is a low pressure polyethylene (PE), then such low pressure PE is preferably selected from a very low density ethylene copolymer (VLDPE), a linear low density ethylene copolymer (LLDPE), a medium density ethylene copolymer (MDPE) or a high density ethylene homopolymer or copolymer (HDPE). These well known types are named according to their density area. The term VLDPE includes herein polyethylenes which are also known as plastomers and elastomers and covers the density range of from 850 to 909 kg/m$^3$. The LLDPE has a density of from 909 to 930 kg/m³, preferably of from 910 to 929 kg/m³, more preferably of from 915 to 929 kg/m³. The MDPE has a density of from 930 to 945 kg/m³, preferably 931 to 945 kg/m³. The HDPE has a density of more than 945 kg/m³, preferably of more than 946 kg/m³, preferably from 946 to 977 kg/m³, more preferably from 946 to 965 kg/m³.

More preferably, such low pressure copolymer of ethylene for the polyolefin (S) is copolymerized with at least one comonomer selected from $C_{3-20}$ alpha olefin, more preferably from $C_{4-12}$ alpha-olefin, more preferably from $C_{4-8}$ alpha-olefin, e.g. with 1-butene, 1-hexene or 1-octene, or a mixture thereof. The amount of comonomer(s) present in a PE copolymer is from 0.1 to 15 mol %, typically 0.25 to 10 mol-%.

Moreover, where the polyolefin (S) is a low pressure PE polymer, then such PE can be unimodal or multimodal with respect to molecular weight distribution (MWD=Mw/Mn). Generally, a polymer comprising at least two polymer fractions, which have been produced under different polymerization conditions (including i.a. any of the process parameters, feeds of starting materials, feeds of process controlling agents and feeds of catalyst systems) resulting in different (weight average) molecular weights and molecular weight distributions for the fractions, is referred to as "multimodal". The prefix "multi" relates to the number of different polymer fractions present in the polymer. Thus, for example, multimodal polymer includes so called "bimodal" polymer consisting of two fractions. The form of the molecular weight distribution curve, i.e. the appearance of the graph of the polymer weight fraction as a function of its molecular weight, of a multimodal polymer will show two or more maxima or is typically distinctly broadened in comparison with the curves for the individual fractions.

Unimodal low pressure PE can be produced e.g. by a single stage polymerisation in a single reactor in a well known and documented manner. The multimodal (e.g. bimodal) low pressure PE can be produced e.g. by blending mechanically together two or more separate polymer components or, preferably, by in-situ blending during the polymerisation process of the components. Both mechanical and in-situ blending are well known in the field. In-situ blending means the polymerisation of the polymer components under different polymerisation conditions, e.g. in a multistage, i.e. two or more stage, polymerization process or by the use of two or more different polymerization catalysts, in a one stage polymerization process, or by use of a combination of multistage polymerisation process and two or more different polymerisation catalysts. The polymerisation zones may operate in bulk, slurry, solution, or gas phase conditions or in any combinations thereof, as known in the field.

According to a second embodiment the polyolefin (S) is a polyethylene produced in a high pressure polymerisation process, preferably by radical polymerisation in the presence of an initiator(s). More preferably the polyolefin (S) is a low density polyethylene (LDPE). When the polyolefin (S), preferably polyethylene, is produced in a high pressure process, then the preferred polyolefin is an LDPE homopolymer or an LDPE copolymer of ethylene with one or more comonomers. In some embodiments the LDPE homopolymer and copolymer may be unsaturated. Examples of suitable LDPE polymers and general principles for their polymerization are described above in relation to polyolefin of the polymer composition of the insulation layer, however, without limiting to any specific lubricant in the compressor(s) during the compressing step (a) of the process. For the production of ethylene (co)polymers by high pressure radical polymerization, reference can be made to the Encyclopedia of Polymer Science and Engineering, Vol. 6 (1986), pp 383-410 and Encyclopedia of Materials: Science and Technology, 2001 Elsevier Science Ltd.: "Polyethylene: High-pressure, R. Klimesch, D. Littmann and F.-O. Mähling pp. 7181-7184.

The conductive filler of the semiconductive composition is preferably a carbon black. Any carbon black can be used which is electrically conductive and provides semiconductive property needed for the semiconductive layer.

Preferably, the carbon black may have a nitrogen surface area (BET) of 5 to 400 m²/g, preferably of 10 to 300 m²/g, more preferably of 30 to 200 m²/g, when determined according to ASTM D3037-93. Further preferably the carbon black has one or more of the following properties: i) a primary particle size of at least 5 nm which is defined as the number average particle diameter according to ASTM D3849-95a procedure D, ii) iodine absorption number (IAN) of at least 10 mg/g, preferably of 10 to 300 mg/g, more preferably of 30 to 200 mg/g, when determined according to ASTM D-1510-07; and/or iii) DBP (dibutyl phthalate) absorption number of 60 to 300 cm³/100 g, preferably of 70 to 250 cm³/100 g, more preferably of 80 to 200, preferably of 90 to 180 cm³/100 g, when measured according to ASTM D 2414-06a. More preferably the carbon black has a nitrogen surface area (BET) and properties (i), (ii) and (iii) as defined above. Non-limiting examples of preferable carbon blacks include furnace carbon blacks and acetylene blacks.

The amount of carbon black is at least such that a semiconducting composition is obtained. Depending on the desired use, the conductivity of the carbon black and conductivity of the composition, the amount of carbon black can vary.

Furnace carbon black is generally acknowledged term for the well known carbon black type that is produced in a furnace-type reactor. As examples of carbon blacks, the preparation process thereof and the reactors, reference can be made to e.g. EP629222 of Cabot, U.S. Pat. No. 4,391,789, U.S. Pat. No. 3,922,335 and U.S. Pat. No. 3,401,020. Furnace carbon black is distinguished herein from acetylene carbon black which produced by reaction of acetylene and unsaturated hydrocarbons, e.g. as described in U.S. Pat. No. 4,340,577.

Acetylene black is a generally acknowledged term and are very well known and e.g. supplied by Denka. They are produced in an acetylene black process.

Preferably, the semiconductive composition of the cable has a volume resistivity, measured at 90° C. according to ISO 3915 (1981), of less than 500,000 Ohm cm, more preferably less than 100,000 Ohm cm, even more preferably less than 50,000 Ohm cm. Volume resistivity is in a reciprocal relationship to electrical conductivity, i.e. the lower the resistivity, the higher is the conductivity.

The semiconductive composition of the present invention comprises, depending on the used carbon black, preferably 9.5 to 49.5 wt %, more preferably 9 to 49 wt %, more preferably 5 to 45 wt % carbon black, based on the weight of the polymer composition.

The crosslinking option and usable crosslinking agents are described above in relation to the description of the polymer composition of the insulation layer.

The semiconductive composition of the cable may naturally comprise further components, such as further polymer component(s), like miscible thermoplastic(s); or further additive(s), such as antioxidant(s), scorch retardant(s); additive(s), such as any of antioxidant(s), scorch retarder(s) (SR), water treeing retardant additive(s), crosslinking booster(s), stabiliser(s), like voltage stabilizer(s), flame retardant additive(s), acid, ion scavenger(s), further filler(s), processing aid(s), like lubricant(s), foaming agent(s) or colorant(s), as known in the polymer field. The additives depend on the type of the layer, e.g. whether semiconductive or insulation layer, and can be selected by a skilled person. The total amount of further additive(s), if present, is generally from 0.01 to 10 wt %, preferably from 0.05 to 7 wt %, more preferably from 0.2 to 5 wt %, based on the total amount of the polymer composition.

The semiconductive composition of the cable of the invention comprises typically at least 50 wt %, preferably at least 60 wt %, more preferably at least 70 wt % to 100 wt %, of the polyolefin based on the total weight of the polymer component(s) present in the semiconductive composition. However, it is to be understood herein that the semiconductive composition may comprise further component(s) other than polymer components, such as additive(s) which may optionally be added in a mixture with a carrier polymer, i.e. in so called master batch.

Jacketing Composition of the Jacketing Layer of the Cable

The jacketing composition preferably comprises a polyolefin (j) which is preferably selected from a polypropylene (PP), polyethylene (PE), or any mixtures thereof. More preferably, the polyolefin (j) of the jacketing composition is selected independently from the polyolefin (S) as described for the first and second semiconductive composition.

The crosslinking option and usable crosslinking agents are described above in relation to the description of the polymer composition of the insulation layer.

The jacketing composition may comprises further components such as further polymer component(s), further additive(s), such as antioxidant(s), stabiliser(s), fillers, pigments or any mixtures thereof. The jacketing layer comprises preferably a pigment or carbon black, or both, in conventionally used amounts.

The jacketing composition of the cable of the invention comprises typically at least 50 wt %, preferably at least 60 wt %, more preferably at least 70 wt % to 100 wt %, of the jacketing polyolefin based on the total weight of the polymer component(s) present in the jacketing composition. However, it is to be understood herein that the jacketing composition may comprise further component(s) other than polymer components, such as additive(s) which may optionally be added in a mixture with a carrier polymer, i.e. in so called master batch.

AC Power Cable of the Invention

An alternating current (AC) power cable of the invention is very suitable for AC power cables, especially for power cables operating at voltages between 6 kV and 36 kV (medium voltage (MV) cables) and at voltages higher than 36 kV, known as high voltage (HV) cables and extra high voltage (EHV) cables, which EHV cables operate, as well known, at very high voltages. The terms have well known meanings and indicate the operating level of such cables. The most preferred AC power cable is a Accordingly, the polymer composition with advantageous low dielectric losses properties is highly suitable HV or EHV AC power cable which operates at voltages higher than 36 kV, preferably at voltages of 40 kV or higher, even at voltages of 50 kV or higher. EHV AC power cables operate at very high voltage ranges e.g as high as up to 800 kV, however without limiting thereto.

The invention also provides a process for producing an alternating current (AC) power cable, preferably a HV or EHV AC power cable, as defined above or claims, wherein the process comprises the steps of applying on a conductor an inner semiconductive layer comprising a first semiconductive composition, an insulation layer comprising a polymer composition, an outer semiconductive layer comprising a second semiconductive composition, and optionally, and preferably, a jacketing layer comprising a jacketing composition, and optionally, and preferably, crosslinking at least the polyolefin of the polymer composition of the insulation layer, optionally, and preferably, the first semiconductive composition of the inner semiconductive layer, optionally the second semiconductive composition of the outer semiconductive layer and optionally the jacketing composition of the optional jacketing layer, in the presence of a crosslinking agent and at crosslinking conditions.

In the preferred embodiment of the HV or EHV AC power cable production process of the invention the process comprises the steps of (a)
providing and mixing, preferably meltmixing in an extruder, an optionally crosslinkable first semiconductive composition comprising a polyolefin, a conductive filler, preferably carbon black, and optionally further component(s) for the inner semiconductive layer, providing and mixing, preferably meltmixing in an extruder, a crosslinkable polymer composition of the invention for the insulation layer, providing and mixing, preferably meltmixing in an extruder, an optionally crosslinkable second semiconductive composition which comprises a polyolefin, a conductive filler, preferably carbon black, and optionally further component(s) for the outer semiconductive layer, providing and mixing, preferably meltmixing in an extruder, an optionally crosslinkable jacketing composition which comprises a polyolefin and optionally further component(s) for the outer semiconductive layer, (b) applying on a conductor, preferably by coextrusion,
a meltmix of the first semiconductive composition obtained from step (a) to form the inner semiconductive layer, a meltmix of polymer composition of the invention obtained from step (a) to form the insulation layer, a meltmix of the second semiconductive composition obtained from step (a) to form the outer semiconductive layer, a meltmix of the jacketing composition obtained from step (a) to form the shield jacketing layer, and (c) optionally crosslinking at crosslinking conditions one or more of the polymer composition of the insulation layer, the semiconductive composition of the inner semiconductive layer, the semiconductive composition of the outer semiconductive layer, and the jacketing composition of the jacketing layer of the obtained cable, preferably at least the polymer composition of the insulation layer, more preferably the polymer composition of the insulation layer, at least the semiconductive composition of the inner semiconductive layer, optionally the semiconductive composition of the outer semiconductive layer and optionally the jacketing composition of the jacketing layer.

Melt mixing means mixing above the melting point of at least the major polymer component(s) of the obtained mixture and is typically carried out in a temperature of at least 10-15° C. above the melting or softening point of polymer component(s).

The term "(co)extrusion" means herein that in case of two or more layers, said layers can be extruded in separate steps, or at least two or all of said layers can be coextruded in a same extrusion step, as well known in the art. The term "(co)extrusion" means herein also that all or part of the layer(s) are formed simultaneously using one or more extrusion heads. For instance triple extrusion can be used for forming three cable layers.

As well known, the polymer composition of the invention and the first and second semiconductive compositions and the optional, and preferable, jacketing composition can be produced before or during the cable production process. Moreover the polymer composition of the insulation layer, the first and second semiconductive compositions and the optional, and preferable, jacketing composition can each independently comprise part or all of the component(s) thereof before introducing to the (melt) mixing step a) of the cable production process.

Preferably, said part or all of the polymer composition, preferably at least the polyolefin, is in form of powder, grain or pellets, when provided to the cable production process. Pellets can be of any size and shape and can be produced by any conventional pelletising device, such as a pelletising extruder.

According to one embodiment, at least the polymer composition comprises said optional further component(s). In this embodiment part or all of said further component(s) may e.g. be added
1) by meltmixing to the polyolefin, which may be in a form as obtained from a polymerisation process, and then the obtained meltmix is pelletised, and/or
2) by mixing to the pellets of the polyolefin which pellets may already contain part of said further component(s). In this option 2) part or all of the further component(s) can be meltmixed together with the pellets and then the obtained meltmix is pelletised; and/or part or all of the further components can be impregnated to the solid pellets.

In an alternative second embodiment, the polymer composition may be prepared in connection with the cable production line e.g. by providing the polyolefin, preferably in form of pellets which may optionally comprise part of the further component(s), and combined with all or rest of the further component(s) in the mixing step a) to provide a (melt) mix for the step b) of the process of the invention. In case the pellets of the polyolefin contain part of the further component(s), then the pellets may be prepared as described in the above first embodiment.

The further component(s) is preferably selected at least from one or more additive(s), preferably at least from free radical generating agent(s), more preferably from peroxide(s), optionally, and preferably, from antioxidant(s) and optionally from scorch retardant(s) as mentioned above.

The mixing step a) of the provided polymer composition, the first and second semiconductive compositions and the optional, and preferable, jacketing composition is preferably carried out in the cable extruder. The step a) may optionally comprise a separate mixing step, e.g. in a mixer, preceding the cable extruder. Mixing in the preceding separate mixer can be carried out by mixing with or without external heating (heating with an external source) of the component(s). Any further component(s) of the polymer composition or the first and second semiconductive composition and the optional, and preferable, jacketing composition, if present and added during the cable production process, can be added at any stage and any point(s) in to the cable extruder, or to the optional separate mixer preceding the cable extruder. The addition of additives can be made simultaneously or separately as such, preferably in liquid form, or in a well known master batch, and at any stage during the mixing step (a).

It is preferred that the (melt) mix of the polymer composition obtained from (melt) mixing step (a) consists of the polyolefin of the invention as the sole polymer component. The optional, and preferable, additive(s) can be added to polymer composition as such or as a mixture with a carrier polymer, i.e. in a form of so-called master batch.

Most preferably the mixture of the polymer composition of the insulation layer and the mixture of each of the first and second semiconductive compositions and the optional, and preferable, jacketing composition obtained from step (a) is a meltmix produced at least in an extruder.

In the preferred embodiment at least the polymer composition of the insulation layer of the invention is provided to the cable production process in a form of premade pellets.

In a preferred embodiment of the cable production process, a crosslinked MV, HV or EHV AC power cable, more preferably a crosslinked HV or EHV AC power cable, is produced, which comprises a conductor surrounded by an inner semiconductive layer comprising, preferably consisting of, a first semiconductive composition, an insulation layer comprising, preferably consisting of, a crosslinkable polymer composition of the invention comprising a polyolefin and a crosslinking agent, preferably peroxide, as defined above, an outer semiconductive layer comprising, preferably consisting of, a second semiconductive composition, and the optional, and preferable, jacketing layer comprising, preferably consisting of, the jacketing composition, wherein at least the polymer composition of the insulation layer is crosslinked in the presence of said crosslinking agent, more preferably, wherein at least the first semiconductive composition of the inner semiconductive layer and the polymer composition of the insulation layer are crosslinked.

If crosslinked, then the crosslinking agent(s) can already be present in the first and second semiconductive composition before introducing to the crosslinking step (c) or introduced during the crosslinking step (c). Peroxide is the preferred crosslinking agent for said first and second semiconductive compositions and for the optional, and preferable, jacketing composition in case any of said layer(s) are crosslinked, and is then preferably included to the pellets of semiconductive compositions and the pellets of the jacketing composition before the composition is used in the cable production process as described above.

Crosslinking can be carried out at increased temperature which is chosen, as well known, depending on the type of crosslinking agent. For instance temperatures above 150° C. are typical, however without limiting thereto.

Insulating layers for MV, HV or EHV, preferably for HV or EHV, AC power cables generally have a thickness of at least 2 mm, typically of at least 2.3 mm, when measured from a cross section of the insulation layer of the cable, and the thickness increases with increasing voltage the cable is designed for.

Determination Methods

Unless otherwise stated in the description or experimental part the following methods were used for the property determinations.

Wt %: % by weight

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylenes and may be determined at different loadings such as 2.16 kg ($MFR_2$) or 21.6 kg ($MFR_{21}$).

Density

The density was measured according to ISO 1183-2. The sample preparation was executed according to ISO 1872-2 Table 3 Q (compression moulding).

Molecular Weight

The Mz, Mw, Mn, and MWD are measured by Gel Permeation Chromatography (GPC) for low molecular weight polymers as known in the field.

Comonomer Contents a) Quantification of alpha-olefin content in linear low density polyethylenes and low density polyethylenes by NMR spectroscopy:

The comonomer content was determined by quantitative 13C nuclear magnetic resonance (NMR) spectroscopy after basic assignment (J. Randall JMS—Rev. Macromol. Chem. Phys., C29(2&3), 201-317 (1989)). Experimental parameters were adjusted to ensure measurement of quantitative spectra for this specific task.

Specifically solution-state NMR spectroscopy was employed using a Bruker AvanceIII 400 spectrometer. Homogeneous samples were prepared by dissolving approximately 0.200 g of polymer in 2.5 ml of deuterated-tetrachloroethene in 10 mm sample tubes utilising a heat block and rotating tube oven at 140° C. Proton decoupled 13C single pulse NMR spectra with NOE (powergated) were recorded using the following acquisition parameters: a flip-angle of 90 degrees, 4 dummy scans, 4096 transients an acquisition time of 1.6 s, a spectral width of 20 kHz, a temperature of 125° C., a bilevel WALTZ proton decoupling scheme and a relaxation delay of 3.0 s. The resulting FID was processed using the following processing parameters: zero-filling to 32 k data points and apodisation using a gaussian window function; automatic zeroth and first order phase correction and automatic baseline correction using a fifth order polynomial restricted to the region of interest.

Quantities were calculated using simple corrected ratios of the signal integrals of representative sites based upon methods well known in the art.

b) Comonomer content of polar comonomers in low density polyethylene (1) Polymers containing >6 wt. % polar comonomer units Comonomer content (wt %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene ethyl acrylate, ethylene butyl acrylate and ethylene methyl acrylate. Film samples of the polymers were prepared for the FTIR measurement: 0.5-0.7 mm thickness was used for ethylene butyl acrylate and ethylene ethyl acrylate and 0.10 mm film thickness for ethylene methyl acrylate in amount of >6 wt %. Films were pressed using a Specac film press at 150° C., approximately at 5 tons, 1-2 minutes, and then cooled with cold water in a not controlled manner. The accurate thickness of the obtained film samples was measured.

After the analysis with FTIR, base lines in absorbance mode were drawn for the peaks to be analysed. The absorbance peak for the comonomer was normalised with the absorbance peak of polyethylene (e.g. the peak height for butyl acrylate or ethyl acrylate at 3450 $cm^{-1}$ was divided with the peak height of polyethylene at 2020 $cm^{-1}$). The NMR spectroscopy calibration procedure was undertaken in the conventional manner which is well documented in the literature, explained below.

For the determination of the content of methyl acrylate a 0.10 mm thick film sample was prepared. After the analysis the maximum absorbance for the peak for the methylacrylate at 3455 $cm^{-1}$ was subtracted with the absorbance value for the base line at 2475 $cm^{-1}$ ($A_{methylaclylate}-A_{2475}$). Then the maximum absorbance peak for the polyethylene peak at 2660 $cm^{-1}$ was subtracted with the absorbance value for the base line at 2475 $cm^{-1}$ ($A_{2660}-A_{2475}$). The ratio between ($A_{methylactylate}-A_{2475}$) and ($A_{2660}-A_{2475}$) was then calculated in the conventional manner which is well documented in the literature.

The weight-% can be converted to mol-% by calculation. It is well documented in the literature.

Quantification of Copolymer Content in Polymers by NMR Spectroscopy

The comonomer content was determined by quantitative nuclear magnetic resonance (NMR) spectroscopy after basic assignment (e.g. "NMR Spectra of Polymers and Polymer Additives", A. J. Brandolini and D. D. Hills, 2000, Marcel Dekker, Inc. New York). Experimental parameters were adjusted to ensure measurement of quantitative spectra for this specific task (e.g "200 and More NMR Experiments: A Practical Course", S. Berger and S. Braun, 2004, Wiley-VCH, Weinheim). Quantities were calculated using simple corrected ratios of the signal integrals of representative sites in a manner known in the art.

(2) Polymers Containing 6 Wt. % or Less Polar Comonomer Units

Comonomer content (wt. %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene butyl acrylate and ethylene methyl acrylate. For the FT-IR measurement a film samples of 0.05 to 0.12 mm thickness were prepared as described above under method 1). The accurate thickness of the obtained film samples was measured.

After the analysis with FT-IR base lines in absorbance mode were drawn for the peaks to be analysed. The maximum absorbance for the peak for the comonomer (e.g. for methylacrylate at 1164 $cm^{-1}$ and butylacrylate at 1165 $cm^{-1}$) was subtracted with the absorbance value for the base line at 1850 $cm^{-1}$ ($A_{polar\ comonomer}-A_{1850}$). Then the maximum absorbance peak for polyethylene peak at 2660 $cm^{-1}$ was subtracted with the absorbance value for the base line at 1850 $cm^{-1}$ ($A_{2660}-A_{1850}$). The ratio between ($A_{comonomer}-A_{1850}$) and ($A_{2660}-A_{1850}$) was then calculated. The NMR spectroscopy calibration procedure was undertaken in the conventional manner which is well documented in the literature, as described above under method 1).

The weight-% can be converted to mol-% by calculation. It is well documented in the literature.

Test for Tan δ Measurements on 10 kV Cables

Cable Production

Polymers pellets of the test polymer composition were used to produce the insulation layer of the test 10 kV cables on a Maillefer pilot cable line of CCV type. The cables have 3.4 mm nominal insulation thickness (the inner semiconductive layer is 0.9 mm thick and the outer semiconductive layer is 1 mm thick). The conductor cross section was 50 $mm^2$ stranded aluminium. The cable was produced as a 1+2 construction (e.g. first the inner semiconductive layer was applied onto the conductor and then the remaining two layer were applied via the same extrusion head to the conductor having already the inner semiconductive layer applied). The semiconductive material used as inner and out semiconductive material was LE0592 (a commercially semiconductive material supplied by Borealis). The cable cores were produced with a line speed of 1.6 m/min.

Cable Length:

Preparation of Cable Sample:

12.5 m of each cable were available for the tests; active test length in the loss factor tests was approximately 11 m. The length is chosen to be in accordance with IEC 60502-2; i.e. ≥10 m active test length between the guard rings of the test object.

Conditioning:

The cables are thermally treated in a ventilated oven at 70° C. for 72 hours before the measurements. The samples are afterwards kept in sealed aluminium bags until the tan δ measurements are done.

Test Method:

Both ends of the loss factor cables were equipped with electric field grading cloths. Each termination was 0.7 m long. The ends were put into plastic bags that were filled with $SF_6$-gas and sealed by tapes. The $SF_6$-gas was used to increase the corona inception voltage beyond the maximum test voltage of ~55 kV.

20 cm from the stress cones guard rings were introduced. A 2 mm gap was opened in the insulation screen. A 5 cm long thick walled heat shrink tube (Raychem) was used over the guard rings to avoid any influence of partial discharges and/or leakage currents from the highly stressed terminations during the measurements.

The active test length was wrapped in a 0.45 m wide and 0.2 mm thick Al-foil (6-7 layers). Afterwards this was covered with a continuous insulating heat shrinkable tube.

All tan δ-measurements were performed with the cable coiled inside a large ventilated oven. The terminations were mounted and connected to the high voltage transformer outside the ventilated oven. The guard rings were also located outside of the oven.

In order to reach isothermal conditions within the entire cable a period of 2 hours was required between the measurements on each temperature level. The cable is thus heated by this oven, and not by conductor heating.

The 50 Hz test voltages corresponding to 5, 10, 15, 20 and 25 kV/mm conductor stress were determined after the dimensions of the cables were measured.

The tan δ bridge was of the type Schering Bridge Tettex 2801 H1-64. The system was checked prior to the measurements by the use of tan δ standards.

Method for Determination of the Amount of Double Bonds in the Polymer Composition or in the Polymer The method describes generally the determination of different type of double bonds and the part of the description is used which describes the determination of the vinyl group content.

A) Quantification of the Amount of Carbon-Carbon Double Bonds by IR Spectroscopy Quantitative infrared (IR) spectroscopy was used to quantify the amount of carbon-carbon doubles (C=C). Calibration was achieved by prior determination of the molar extinction coefficient of the C=C functional groups in representative low molecular weight model compounds of known structure.

The amount of each of these groups (N) was determined as number of carbon-carbon double bonds per thousand total carbon atoms (C=C/1000C) via:

$$N=(A\times 14)/(E\times L\times D)$$

were A is the maximum absorbance defined as peak height, E the molar extinction coefficient of the group in question ($1 \cdot mol^{-1} \cdot mm^{-1}$), L the film thickness (mm) and D the density of the material ($g \cdot cm^{-1}$).

The total amount of C=C bonds per thousand total carbon atoms can be calculated through summation of N for the individual C=C containing components.

For polyethylene samples solid-state infrared spectra were recorded using a FTIR spectrometer (Perkin Elmer 2000) on compression moulded thin (0.5-1.0 mm) films at a resolution of 4 $cm^{-1}$ and analysed in absorption mode.

1) Polymer Compositions Comprising Polyethylene Homopolymers and Copolymers, Except Polyethylene Copolymers with >0.4 Wt % Polar Comonomer For polyethylenes three types of C=C containing functional groups were quantified, each with a characteristic absorption and each calibrated to a different model compound resulting in individual extinction coefficients:

vinyl (R—CH=CH2) via 910 $cm^{-1}$ based on 1-decene [dec-1-ene] giving E=13.13 $1 \cdot mol^{-1} \cdot mm^{-1}$ vinylidene (RR'C=CH2) via 888 $cm^{-1}$ based on 2-methyl-1-heptene[2-methyhept-1-ene] giving E=18.24 $1 \cdot mol^{-1} \cdot mm^{-1}$ trans-vinylene (R—CH=CH—R') via 965 $cm^{-1}$ based on trans-4-decene [(E)-dec-4-ene] giving E=15.14 $1 \cdot mol^{-1} \cdot mm^{-1}$ For polyethylene homopolymers or copolymers with <0.4 wt % of polar comonomer linear baseline correction was applied between approximately 980 and 840 $cm^{-1}$.

2) Polymer Compositions Comprising Polyethylene Copolymers with >0.4 Wt % Polar Comonomer For polyethylene copolymers with >0.4 wt % of polar comonomer two types of C=C containing functional groups were quantified, each with a characteristic absorption and each calibrated to a different model compound resulting in individual extinction coefficients:

vinyl (R—CH=CH2) via 910 $cm^{-1}$ based on 1-decene [dec-1-ene] giving E=13.13 $1 \cdot mol^{-1} \cdot mm^{-1}$ vinylidene (RR'C=CH2) via 888 $cm^{-1}$ based on 2-methyl-1-heptene [2-methyhept-1-ene] giving E=18.24 $1 \cdot mol^{-1} \cdot mm^{-1}$

EBA:

For poly(ethylene-co-butylacrylate) (EBA) systems linear baseline correction was applied between approximately 920 and 870 $cm^{-1}$.

EMA:

For poly(ethylene-co-methylacrylate) (EMA) systems linear baseline correction was applied between approximately 930 and 870 $cm^{-1}$.

3) Polymer Compositions Comprising Unsaturated Low Molecular Weight Molecules

For systems containing low molecular weight C=C containing species direct calibration using the molar extinction coefficient of the C=C absorption in the low molecular weight species itself was undertaken.

B) Quantification of Molar Extinction Coefficients by IR Spectroscopy

The molar extinction coefficients were determined according to the procedure given in ASTM D3124-98 and ASTM D6248-98. Solution-state infrared spectra were recorded using a FTIR spectrometer (Perkin Elmer 2000) equipped with a 0.1 mm path length liquid cell at a resolution of 4 cm$^{-1}$.

The molar extinction coefficient (E) was determined as 1·mol$^{-1}$·mm$^{-1}$ via:

$$E = A/(C \times L)$$

were A is the maximum absorbance defined as peak height, C the concentration (mol·l$^{-1}$) and L the cell thickness (mm).

At least three 0.18 mol·l$^{-1}$ solutions in carbondisulphide (CS$_2$) were used and the mean value of the molar extinction coefficient determined.

EXPERIMENTAL PART

Preparation of Polyolefins of the Examples of the Present Invention and the Reference Examples The polyolefins were low density polyethylenes produced in a high pressure reactor. The production of inventive and reference polymers is described below. As to CTA feeds, e.g. the PA content can be given as liter/hour or kg/h and converted to either units using a density of PA of 0.807 kg/liter for the recalculation.

Comparative Example 1

Polyethylene Polymer Produced in a High Pressure Reactor

Purified ethylene was liquefied by compression and cooling to a pressure of 90 bars and a temperature of −30° C. and split up into to two equal streams of roughly 14 tons/hour each. The CTA (methyl ethyl ketone (MEK)), air and a commercial peroxide radical initiator dissolved in a solvent were added to the two liquid ethylene streams in individual amounts. The two mixtures were separately pumped through an array of 4 intensifiers to reach pressures of 2100-2300 bars and exit temperatures of around 40° C. These two streams were respectively fed to the front (zone 1) (50%) and side (zone 2) (50%) of a split-feed two-zone tubular reactor. The inner diameters and lengths of the two reactor zones were 32 mm and 200 m for zone 1 and 38 mm and 400 m for zone 2. MEK was added in amounts of around 216 kg/h to the front stream to maintain a MFR$_2$ of around 2 g/10 min. The front feed stream was passed through a heating section to reach a temperature sufficient for the exothermal polymerization reaction to start. The reaction reached peak temperatures were around 250° C. and around 318° C. in the first and second zones, respectively. The side feed stream cooled the reaction to an initiation temperature of the second zone of 165-170° C. Air and peroxide solution was added to the two streams in enough amounts to reach the target peak temperatures. The reaction mixture was depressurized by product valve, cooled and polymer was separated from unreacted gas.

Comparative Example 2

Polyethylene Polymer Produced in a High Pressure Reactor

Purified ethylene was liquefied by compression and cooling to a pressure of 90 bars and a temperature of −30° C. and split up into to two equal streams of roughly 14 tons/hour each. The CTA (methyl ethyl ketone, MEK), air and a commercial peroxide radical initiator dissolved in a solvent were added to the two liquid ethylene streams in individual amounts. Here also 1,7-octadiene was added to the reactor in amount of around 24 kg/h. The two mixtures were separately pumped through an array of 4 intensifiers to reach pressures of 2200-2300 bars and exit temperatures of around 40° C. These two streams were respectively fed to the front (zone 1) (50%) and side (zone 2) (50%) of a split-feed two-zone tubular reactor. The inner diameters and lengths of the two reactor zones were 32 mm and 200 m for zone 1 and 38 mm and 400 m for zone 2. MEK was added in amounts of around 205 kg/h to the front stream to maintain a MFR$_2$ of around 2 g/10 min. The front feed stream was passed through a heating section to reach a temperature sufficient for the exothermal polymerization reaction to start. The reaction reached peak temperatures were around 253° C. and around 290° C. in the first and second zones, respectively. The side feed stream cooled the reaction to an initiation temperature of the second zone of around 168° C. Air and peroxide solution was added to the two streams in enough amounts to reach the target peak temperatures. The reaction mixture was depressurized by product valve, cooled and polymer was separated from unreacted gas.

Inventive Example 1

Polyethylene Polymer Produced in a High Pressure Reactor

Ethylene with recycled CTA was compressed in a 5-stage precompressor and a 2-stage hyper compressor with intermediate cooling to reach initial reaction pressure of ca 2700 bar. The total compressor throughput was ca 30 tons/hour. In the compressor area approximately 5.6 kg/hour of propion aldehyde was added together with approximately 89 kg propylene/hour as chain transfer agents to maintain an MFR of 1.9 g/10 min. The compressed mixture was heated to 163° C. in a preheating section of a front feed three-zone tubular reactor with an inner diameter of ca 40 mm and a total length of 1200 meters. A mixture of commercially available peroxide radical initiators dissolved in isododecane was injected just after the preheater in an amount sufficient for the exothermal polymerisation reaction to reach peak temperatures of ca 286° C. after which it was cooled to approximately 215° C. The subsequent 2$^{nd}$ and 3$^{rd}$ peak reaction temperatures were 285° C. and 268° C. respectively with a cooling in between to 230° C. The reaction mixture was depressurised by a kick valve, cooled and polymer was separated from unreacted gas.

Inventive Example 2

Polyethylene Polymer Produced in a High Pressure Reactor

Ethylene with recycled CTA was compressed in a 5-stage precompressor and a 2-stage hyper compressor with intermediate cooling to reach initial reaction pressure of ca 2580 bar. The total compressor throughput was ca 30 tons/hour. In the compressor area approximately 14.4 kg/hour of propion aldehyde was added to maintain an MFR of around 2.0 g/10 min. The compressed mixture was heated to 164° C. in a preheating section of a front feed three-zone tubular reactor with an inner diameter of ca 40 mm and a total length of 1200 meters. A mixture of commercially available peroxide radical initiators dissolved in isododecane was injected just after the preheater in an amount sufficient for the exothermal polymerisation reaction to reach peak temperatures of ca 305° C. after which it was cooled to approximately 208° C.

The subsequent 2$^{nd}$ and 3$^{rd}$ peak reaction temperatures were 286° C. and 278° C. respectively with a cooling in between to 237° C. The reaction mixture was depressurised by a kick valve, cooled and polymer was separated from unreacted gas.

Inventive Example 3

Polyethylene Polymer Produced in a High Pressure Reactor

Ethylene with recycled CTA was compressed in a 5-stage precompressor and a 2-stage hyper compressor with intermediate cooling to reach initial reaction pressure of ca 2800 bar. The total compressor throughput was ca 30 tons/hour. In the compressor area approximately 3.6 kg/hour of propion aldehyde was added together with approximately 138 kg/hour of propylene as chain transfer agents to maintain an MFR of 2.1 g/10 min. Here also 1,7-octadiene was added to the reactor in amount of 30.7 kg/h. The compressed mixture was heated to 167° C. in a preheating section of a front feed three-zone tubular reactor with an inner diameter of ca 40 mm and a total length of 1200 meters. A mixture of commercially available peroxide radical initiators dissolved in isododecane was injected just after the preheater in an amount sufficient for the exothermal polymerisation reaction to reach peak temperatures of ca 271° C. after which it was cooled to approximately 195° C. The subsequent 2$^{nd}$ and 3$^{rd}$ peak reaction temperatures were 269° C. and 247° C. respectively with a cooling in between to 216° C. The reaction mixture was depressurised by a kick valve, cooled and polymer was separated from unreacted gas.

Inventive Example 4

Polyethylene Polymer Produced in a High Pressure Reactor

Ethylene with recycled CTA was compressed in a 5-stage precompressor and a 2-stage hyper compressor with intermediate cooling to reach initial reaction pressure of ca 2745 bar. The total compressor throughput was ca 30 tons/hour. In the compressor area approximately 2.8 kg/hour of propion aldehyde was added together with approximately 77 kg/hour of propylene as chain transfer agents to maintain an MFR of 1.8 g/10 min. Here also 1,7-octadiene was added to the reactor in amount of 28.7 kg/h and butyl acrylate to an amount of around 26 kg/h. The compressed mixture was heated to 161° C. in a preheating section of a front feed three-zone tubular reactor with an inner diameter of ca 40 mm and a total length of 1200 meters. A mixture of commercially available peroxide radical initiators dissolved in isododecane was injected just after the preheater in an amount sufficient for the exothermal polymerisation reaction to reach peak temperatures of ca 286° C. after which it was cooled to approximately 233° C. The subsequent 2$^{nd}$ and 3$^{rd}$ peak reaction temperatures were 280° C. and 266° C. respectively with a cooling in between to 237° C. The reaction mixture was depressurised by a kick valve, cooled and polymer was separated from unreacted gas.

Experimental Results

Mineral oil=mineral oil based lubricant, M-RARUS PE KPL 201, supplier ExxonMobil PAG=polyalkylkene glycol based lubricant, Syntheso D201N from Klueber. PA=propion aldehyde (CAS number: 123-38-6) MEK=methyl ethyl ketone.

| Base Resin Properties | Inv. ex. 1 | Inv. ex. 2 | Inv. ex. 3 | Inv. ex. 4 | Ref. ex. 1 | Ref. ex. 2 |
|---|---|---|---|---|---|---|
| MFR 2.16 kg, 190° C. [g/10 min] | 1.9 | 2.1 | 2.1 | 1.8 | 2.0 | 2.0 |
| Density [kg/m$^3$] | 924 | 922 | 921.3 | 921.2 | 922 | 922 |
| Vinyl [C=C/1000 C] | 0.32 | 0.13 | 0.59 | 0.53 | 0.11 | 0.25 |

The results in below tables show that the inventive polymer compositions produced in HP process using mineral oil as the compressor lubricant have reduced the losses at high stress and high temperature expressed as tan delta measured at 50 Hz.

TABLE 1

Tan delta (50 Hz) at 25 kV/mm and 130° C. of crosslinked 10 kV cables.

| Polymer | Compressor oil | Tan delta (10$^{-4}$) |
|---|---|---|
| Comp Ex 1 | PAG | 13.2 |
| Inv Ex 1 | Mineral oil | 5.4 |
| Inv Ex 2 | Mineral oil | 6.8 |

TABLE 2

Tan delta (50 Hz) at 25 kV/mm and 130° C. of crosslinked 10 kV cables.

| Polymer | Compressor oil | Tan delta (10$^{-4}$) |
|---|---|---|
| Comp Ex 2 | PAG | 16.1 |
| Inv Ex 3 | Mineral oil | 3.4 |
| Inv Ex 4 | Mineral oil | 4.8 |

The jacketing layer is coextruded in a cable extruder in a conventional manner as the shield (outer) layer of the final cable of the invention. The preferable jacketing layer of the cable further contributes to the improved AC electrical properties by means of providing a mechanically protective layer.

What is claimed is:

1. An alternating current (AC) power cable, comprising a conductor surrounded by at least an inner semiconductive layer comprising a first semiconductive composition, an insulation layer comprising a polymer composition, an outer semiconductive layer comprising a second semiconductive composition and,
   wherein the polymer composition of the insulation layer comprises a polyolefin and a crosslinking agent, wherein the polyolefin is an unsaturated LDPE polymer, which is selected from the group consisting of an unsaturated LDPE homopolymer and an unsaturated LDPE copolymer of ethylene with one or more comonomer(s), and
   wherein the polymer composition of the insulation layer has a dielectric loss expressed as tan δ (50 Hz) of 12.0 ×10$^{-4}$ or less, when measured at 25 kV/mm and 130° C. according to "Test for Tan δ measurements on 10 kV cables" as described in the description part under "Determination methods"; and wherein the polyolefin is obtainable by a high pressure process comprising:

(a) compressing one or more monomer(s) under pressure in a compressor, using a compressor lubricant for lubrication,
(b) polymerizing a monomer optionally together with one or more comonomer(s) in a polymerization zone, and
(c) separating the obtained polyolefin from the unreacted products and recovering the separated polyolefin in a recovery zone, wherein the compressor lubricant comprises a mineral oil.

2. The cable according to claim 1, wherein the polymer composition of the insulation layer has a dielectric loss expressed as tan δ (50 Hz) of $11.0 \times 10^{-4}$ or less, when measured at 25 kV/mm and 130° C. according to "Test for Tan δ measurements on 10 kV cables" as described in the description part under "Determination methods".

3. The cable according to claim 1, wherein the polymer composition of the insulation layer has a dielectric loss expressed as tan δ (50 Hz) of $0.01 - 10.0 \times 10^{-4}$, when measured at 25 kV/mm and 130° C. according to "Test for Tan δ measurements on 10 kV cables" as described in the description part under "Determination methods".

4. The cable according to claim 1, wherein the compressor lubricant comprises a white oil as the mineral oil and is suitable for production of polymers for food or medical industry.

5. The alternating current power cable according to claim 4, wherein the white oil comprises paraffinic hydrocarbons.

6. The alternating current power cable according to claim 4, wherein the white oil meets at least one of the following requirements:

a) the white oil has a viscosity of at least $8.5 \times 10^{-6} m^2/s$ at 100° C.;
b) the white oil contains 5% per weight or less of hydrocarbons having less than 25 carbon atoms; and
c) the white oil contains hydrocarbons having an average molecular weight of 480 or more.

7. The cable according to claim 1, wherein the mineral oil is a white mineral oil which meets the requirements given for white mineral oil in European Directive 2002/72/EC of 6 Aug. 2002, Annex V, for plastics used in food contact.

8. The cable according to claim 1, wherein the crosslinking agent is peroxide.

9. The cable according to claim 1, wherein the polyolefin is an unsaturated LDPE homopolymer or an unsaturated LDPE copolymer of ethylene with at least one polyunsaturated comonomer.

10. The cable according to claim 9, wherein the polyolefin is an unsaturated LDPE copolymer of ethylene with at least one polyunsaturated comonomer and one or more other comonomer(s).

11. The cable according to claim 1, wherein each of the inner and outer semiconductive composition comprises independently a conductive filler.

12. The cable according to claim 1, wherein the cable comprises a jacketing layer comprising a jacketing composition.

13. The cable according to claim 1, wherein at least the polymer composition of the insulation layer is crosslinked in the presence of said crosslinking agent.

14. The cable according to claim 1, wherein at least the first semiconductive composition of the inner semiconductive layer and the polymer composition of the insulation layer are crosslinked.

15. The cable according to claim 1, which is a MV, HV or EHV AC power cable.

16. A process for producing an alternating current (AC) power cable according to claim 1, wherein the process comprises:

applying on a conductor an inner semiconductive layer comprising a first semiconductive composition, an insulation layer comprising a polymer composition, an outer semiconductive layer comprising a second semiconductive composition.

17. The process according to claim 16, further comprising:

applying a jacketing layer comprising a jacketing composition on the conductor.

18. The alternating current power cable according to claim 1, wherein the conductor is further surrounded by a jacketing layer comprising a jacketing composition.

19. The alternating current power cable according to claim 1, wherein the mineral oil is a by-product in distillation of petroleum to produce gasoline and other petroleum based products from crude oil.

20. The alternating current power cable according to claim 1, wherein the polyolefin is an unsaturated LDPE copolymer of ethylene with one or more comonomer(s).

* * * * *